United States Patent
Gould

(10) Patent No.: US 8,594,116 B2
(45) Date of Patent: *Nov. 26, 2013

(54) METHODS AND APPARATUS FOR EFFICIENT IP MULTICASTING IN A CONTENT DELIVERY NETWORK

(75) Inventor: Kenneth Gould, Oakton, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 478 days.

This patent is subject to a terminal disclaimer.

(21) Appl. No.: 12/754,534

(22) Filed: Apr. 5, 2010

(65) Prior Publication Data
US 2010/0254296 A1    Oct. 7, 2010

Related U.S. Application Data

(63) Continuation of application No. 11/325,107, filed on Jan. 3, 2006, now Pat. No. 7,693,171.

(51) Int. Cl.
*H04H 20/10* (2008.01)
*H04H 20/28* (2008.01)

(52) U.S. Cl.
USPC ............ 370/432; 370/486; 725/111; 725/120

(58) Field of Classification Search
None
See application file for complete search history.

(56) References Cited

U.S. PATENT DOCUMENTS

| | | |
|---|---|---|
| 5,606,359 A | 2/1997 | Youden et al. |
| 5,708,961 A | 1/1998 | Hylton et al. |
| 5,818,438 A | 10/1998 | Howe et al. |
| 5,872,588 A | 2/1999 | Aras et al. |
| 6,072,982 A | 6/2000 | Haddad |
| 6,181,697 B1 | 1/2001 | Nurenberg et al. |
| 6,198,478 B1 | 3/2001 | Ota et al. |
| 6,259,701 B1 | 7/2001 | Shur et al. |
| 6,510,162 B1 | 1/2003 | Fijolek |
| 6,510,556 B1 | 1/2003 | Kusaba et al. |
| 6,519,062 B1 | 2/2003 | Yoo |
| 6,757,253 B1 | 6/2004 | Cooper et al. |
| 6,889,382 B1 | 5/2005 | Anderson |
| 6,925,257 B2 | 8/2005 | Yoo |
| 7,003,790 B1 | 2/2006 | Inoue et al. |
| 7,009,972 B2 | 3/2006 | Maher |
| 7,054,902 B2 | 5/2006 | Toporek |
| 7,068,639 B1 | 6/2006 | Varma et al. |
| 7,099,308 B2 | 8/2006 | Merrill et al. |
| 7,236,738 B2 | 6/2007 | Settle |
| 7,266,832 B2 | 9/2007 | Miller |
| 7,693,171 B2 * | 4/2010 | Gould ........................ 370/432 |
| 2001/0004768 A1 | 6/2001 | Hodge et al. |

(Continued)

*Primary Examiner* — Min Jung
(74) *Attorney, Agent, or Firm* — Gazdzinski & Associates, PC

(57) ABSTRACT

Methods and apparatus for assigning physical channels in a content-based network. In an exemplary embodiment, the network comprises a cable television network having a plurality of cable modems, and the physical channels are assigned to the cable modems based at least in part on any multicast transmissions that may exist on the system. When two cable modems are receiving the same multicast transmission, the invention causes tuning of one or more of the cable modems to the same physical channel in order to limit the total number multicast transmissions on the network. Multicast transmissions typically comprise video or audio information, but other types of information may also be multicast according to the invention. In another embodiment, a multicast transmission list (containing a list of multicast transmissions and the corresponding physical channels) is sent to the set of cable modems. This list is used by the modems (or associated CPE) to manage channel allocation and tuning.

49 Claims, 14 Drawing Sheets

(56) References Cited

U.S. PATENT DOCUMENTS

| | | |
|---|---|---|
| 2001/0005908 A1 | 6/2001 | Hodge et al. |
| 2002/0056125 A1 | 5/2002 | Hodge et al. |
| 2002/0059626 A1 | 5/2002 | Lemmons |
| 2002/0144284 A1 | 10/2002 | Burroughs et al. |
| 2002/0166121 A1 | 11/2002 | Rovira |
| 2003/0056217 A1 | 3/2003 | Brooks |
| 2003/0217365 A1 | 11/2003 | Caputo |
| 2003/0229681 A1* | 12/2003 | Levitan .................. 709/218 |
| 2004/0024580 A1* | 2/2004 | Salmonsen et al. ............ 703/27 |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2005/0002331 A1 | 1/2005 | Nolle et al. |
| 2005/0204396 A1 | 9/2005 | Kang |
| 2006/0130113 A1 | 6/2006 | Carlucci |
| 2006/0171390 A1* | 8/2006 | La Joie .................. 370/390 |
| 2007/0019645 A1 | 1/2007 | Menon |
| 2007/0022459 A1 | 1/2007 | Gaebel |
| 2007/0104090 A1 | 5/2007 | Howe |
| 2007/0121627 A1 | 5/2007 | Chen |
| 2008/0172690 A1 | 7/2008 | Kanojia et al. |

* cited by examiner

| DOCSIS DOWNSTREAM CHANNEL ID | MULTICAST ADDRESS | VIDEO CHANNEL IDENTIFIER |
|---|---|---|
| 1 | 239.192.1.4 | CBS |
| 1 | 239.192.1.9 | ABC |
| 2 | 239.192.1.13 | MTV |
| 1 | 239.192.1.27 | MTV |
| 2 | 239.192.1.5 | MTV |

FIG. 4a

METHODS AND APPARATUS FOR EFFICIENT IP MULTICASTING IN A CONTENT DELIVERY NETWORK

PRIORITY

This application is a continuation of and claims priority to co-owned and co-pending U.S. patent application Ser. No. 11/325,107 entitled "METHODS AND APPARATUS FOR EFFICIENT IP MULTICASTING IN A CONTENT-BASED NETWORK" filed Jan. 3, 2006, now U.S. Pat. No. 7,693,171 which is incorporated herein by reference in its entirety.

BACKGROUND OF THE INVENTION

1. Field of Invention

The present invention relates generally to the field of network content delivery and bandwidth utilization. More particularly, the present invention is directed to efficient multicasting of packetized content in a system incorporating multiple physical channels.

2. Description of Related Technology

Modern cable networks deliver both audio and video programming as well as Internet access. These services are typically provided via a set of radio frequency channels transmitted through coaxial cable to the subscriber's premises. The use of fiber optical cable is also known, and often both are incorporated in the cable network (Hybrid Fiber Coaxial—"HFC"), however the dominant form of the delivery into the home (the last mile) remains the coaxial cable.

To receive the various services provided by the cable network the customer is often provided with, or required to obtain, customer premises equipment (CPE). For video and audio programming the CPE is typically referred to as a "set top box" or STB The set top box traditionally sat on top of, or in proximity to, the television set, hence the name. For Internet services, the CPE is typically a cable modem (CM). The cable modem modulates and demodulates the RF signals exchanged with the cable network.

Both the cable modem and the set top box receive the set of RF channels delivered over the coaxial cable network. This set of RF channels typically comprise a subset of RF channels dedicated to the transmission of audio and video information, and a subset of RF channels dedicated to the delivery of Internet or other data services.

For the delivery of Internet service, the cable modem is tuned to one of the RF channels dedicated to providing the Internet service. The cable modem processes the signals on the RF channel, and forwards the traffic (e.g., Internet protocol or IP packets) to the requesting device or network on the customer premises, as well as allowing packets to be sent upstream from the consumer's premises.

Different groups of cable modems are typically assigned to different RF channels in order to distribute the traffic more evenly, or achieve other operational goals. In general, assigning different RF channels to different modems is an efficient method of distributing traffic across the network.

However, as a DOCSIS cable modem (pre-DOCSIS 3.0), is typically limited to a theoretical maximum of approximately 40 Mbps of data throughput in the downstream direction (i.e., from head-end or hub to CPE), the number of video programs that can be broadcast to a given CPE device connected to that CM is limited. For example, if a video program consumes 1.5 Mbps, then at most, 26 programs 1.5 Mbps×26=39 Mbps) could be received at any one time, ignoring for present purposes any overhead associated with packet headers, etc. As this 40 Mbps is the limit not only for the single modem, but for all modems sharing the same DOCSIS downstream port on a typical CM termination system (CMTS), the number of simultaneous video programs broadcast to a given neighborhood served by one CMTS port would be limited to 26 programs. Given that a typical modern cable video channel lineup consists of hundreds of different channels, and that high definition (HD) content consumes more than 1.5 Mbps, the entire channel lineup cannot be replicated on a single DOCSIS 2.0 downstream channel, given currently acceptable video encoding bitrates. Even a hypothetical future cable modem capable of 100 Mbps could not support such a broadcast.

Alternatively, multiple DOCSIS downstream channels could be utilized in order to transmit all of the aforementioned channels simultaneously. Given a theoretical 200 channel lineup where each video channel is encoded at 1.5 Mbps, and each DOCSIS channel carries 26 programs, then 8 DOCSIS downstream channels (8 channels×26 programs/channel=208 programs) would be needed to replicate the video broadcasts over DOCSIS. As a DOCSIS 2.0 CM is only capable of tuning to a single DOCSIS downstream channel at any one time, and assuming that there would be multiple user devices (e.g., TV sets) in use simultaneously in a single premises served by a single CM, it is likely that all desired programming for that premises would not be residing on a single DOCSIS downstream channel. Hence, the premises could not receive all of the desired programs simultaneously.

Multicast Traffic

More recently, networks have incorporated the use of multicast Internet traffic or multicast Internet Protocol (IP) transmissions. Multicast Internet traffic is traffic directed from one point to many, which is useful for broadcast type services such as video or audio streaming.

In the day-to-day operation of a cable network, it is often the case that two cable modems will receive the same multicast transmission. In some instances, the two cable modems will be assigned to receive Internet traffic on two different RF channels. In that case, both RF channels will have to transmit the same multicast transmission.

The traditional video content described above is typically MPEG-based video. Video transported to PCs (or IP-based devices such as STSs) over a DOCSIS network is typically MPEG (or another video codec)-over-IP over MPEG. That is, the higher layer MPEG- or other encoded content is encapsulated using an IP protocol, which then utilizes an MPEG packetization for delivery over the RF channels used by a DOCSIS device such as the aforementioned cable modem. If the multicast comprises such a video or other sizable transmission, the amount of network bandwidth consumed may be substantial. This "wasted" bandwidth reduces the overall efficiency of the cable network.

A variety of different approaches to unicast and multicast packet data delivery over networks, including content-based (e.g., cable) networks, are present in the prior art. For example, U.S. Pat. No. 6,181,697 to Nurenberg, et al. and issued on Jan. 30, 2001 entitled "Method for a unicast endpoint client to access a multicast internet protocol (IP) session and to serve as a redistributor of such session" discloses a endpoint client on an IP Unicast network that is provided access to a Multicast session on an IP Multicast network through a Multicast-Unicast gateway server (MUS) which is enabled to re-Multicast that session to other endpoint clients on the network to which it is connected or to endpoint clients on any Multicast-capable sub-network to which it is directly connected. To act as a re-Multicaster, the endpoint client receiving Unicast-addressed packets from the session from the MUS, re-translates these Unicast-addressed packets to Multicast-addressed packets by translating the Unicast address in the distribution field of each packet's header into a Multicast address and overwriting the Unicast address in each header with the Multicast address. When an endpoint client on the same or connected sub-network as the re-Multicaster desires to join a session that is being re-Multicast, it needs only connect to that Multicast address. A endpoint client on a Unicast network can elect to be a re-Multicaster of packets from a session as long as that same session is not being re-Multicast by another endpoint client on any sub-network on which the electing re-Multicaster is connected or a Multicast router is not forwarding packets from the session onto the sub-network.

U.S. Pat. No. 6,259,701 to Shur, et al. issued Jul. 10, 2001 and entitled "Method and system for a unicast endpoint client to access a multicast internet protocol (IP) session" discloses unicast endpoint clients on an IP Unicast network which are provided access to Multicast sessions on an IP Multicast network through a Multicast-Unicast gateway server. The server obtains information about sessions on the Multicast network and makes such information available to a Unicast client on the Unicast network upon request by the client. Upon being presented with a list describing the subject matter of each session, the user at the Unicast client selects the session to which he or she wants to join, which causes the Multicast-Unicast server to join the appropriate session on behalf of the requesting client for each media type in which the joining client wants to be a participant. The server then sets a bidirectional Unicast User Datagram Protocol (UDP) stream between itself and the client. All packets then received by the server from the Unicast client are address-translated to the appropriate Multicast session address. In addition, all packets received by the server on the Multicast session address are address-translated and sent to the Unicast client. The Unicast client is then able to participate in the Multicast session as both a sender and a receiver of packets to and from other Unicast and Multicast clients which are active during the session. Further, the Unicast client is capable of creating a new session, recording a session in the network for later retrieval and playback, and creating and accessing low bandwidth versions of existing sessions.

U.S. Pat. Nos. 6,925,257 and 6,519,062 to Yoo both entitled "Ultra-low latency multi-protocol optical routers for the next generation internet" disclose an ultra-low latency optical router with a peta-bit-per-second total aggregate switching bandwidth, that will scale to a total connectivity of 1000 by 1000, and beyond by modular upgrades. The unit serves as an engine to other optical routers that can function in the context of circuit-switching, flow-switching, burst-switching, and packet-switching. The unit uses advanced wavelength conversion technology to achieve three methods of contention resolution in the router: deflection in wavelength, deflection in space, and buffering in time, and that interfaces a local network to the Supernet.

United States Patent Publication No. 20010004768 to Hodge, et al. published Jun. 21, 2001 entitled "Highly integrated computer controlled digital head end" discloses a highly integrated computer controlled digital headend configured to process a plurality of digital video, a plurality of digital data, a plurality of voice information, and a plurality of upstream communications. The digital headend includes at least one smart network interface module operatively coupled to a shared bus, a downstream module and an upstream module. Preferably, the smart network interface module is configured to receive, transfer and buffer the plurality of digital video, the plurality of digital data, the plurality of voice information and the plurality of upstream communications. The shared bus is operatively coupled to the at least one smart network interface module. The shared bus is configured to transport the digital video, the plurality of digital data, the plurality of voice information, and the plurality of upstream communications. The downstream module is operatively coupled to the shared bus. The downstream module is configured to transmit the plurality of digital video, the plurality of digital data and the plurality of voice information.

United States Patent Publication No. 20010005908 to Hodge, et al. published Jun. 28, 2001 and entitled "Method for buffering video, data and voice signals using a common shared bus" discloses a method for combining a plurality of digital video signals, a plurality of digital data signals, a plurality of voice signals, and a plurality of upstream communications within a digital broadband headend. This digital broadband headend uses a common shared bus to optimize the resources used on a digital headend. More particularly, the method comprises providing a video interface for receiving the plurality of digital video signal, providing a data interface for receiving the plurality of digital data signals, and providing a voice interface for receiving the plurality of voice signals. The method then proceeds to process the plurality of digital video signals, digital data signals and voice signals. After this processing is completed by the digital headend, the plurality of digital video signals is communicated to at least one smart network interface module which is configured to buffer the plurality of digital video signals United States Patent Publication No. 20020056125 to Hodge, et al. published on May 9, 2002 and entitled "Multi-tier buffering system and method which combines video, data, and voice packets" discloses a digital headend system for communicating a plurality of video packets, data packets, voice packets, and control packets. The system includes a buffering module, a re-packetization module, and a synchronization module. The buffering module receives the plurality of video packets, data packets, voice packets, control packets or any combination of packets. Preferably, the buffering module generates a destination address which identifies a particular re-packetization module. The identified re-packetization module is in communication with the buffering module. The first re-packetization module combines the plurality of video packets, data packets, voice packets, control packets or any combination thereof. The synchronizing module receives the re-packetization output and generates a synchronous output stream having the plurality of video packets, data packets, voice packets, control packets or any combination thereof. Preferably, the synchronous output stream is comprised of MPEG transport packets. The present invention also provides a method for communicating the plurality of video packet, data packet, voice packet, control packets, or any combination thereof United States Patent Publication No. 20040045032 to Cummings, et al. published Mar. 4, 2004 and entitled "Mini-MAC implementation of a distributed cable modem termination system (CMTS) architecture" discloses a miniMAC implementation of a distributed CMTS in a hybrid fiber/coaxial (HFC) plant. The distributed CMTS comprises at least one network layer, at least one media access layer, and one or more physical layers. The at least one media access layer includes one or more miniMAC layers. The one or more miniMAC layers are remotely located from a remaining part of the at least one media access layer. The at least one network layer, the remaining part of the at least one media access layer, the one or more miniMAC layers, and the one or more physical layers each function as separate modules, enabling each layer to be in separate component locations of the HFC plant, yet having the at least one network layer connected to the remaining part of the at least one media access layer, the at least one media access layer connected to each of the one or more miniMAC layers, and each of the one or more physical layers connected to each of the one or more miniMAC layers. The one or more miniMAC layers are located in close proximity to the one or more physical layers in the HFC plant. The one or more miniMAC layers convert digital bit streams into packets and maintain timing constraints between the one or more miniMAC layers and the one or more physical layers.

United States Patent Publication No. 20040045037 to Cummings, et al. and published Mar. 4, 2004 entitled "Distributed cable modem termination system (CMTS) architecture implementing a media access control chip" discloses a distributed cable modem termination system (CMTS) in a hybrid fiber/coaxial (HFC) plant. The distributed CMTS comprises a network layer, at least one media access control layer, and at least one physical layer. The media access control layer implements a media access control chip. The media access control chip interfaces with the physical layer to provide timing to maintain components within the physical layer. At least one physical layer is connected to a respective at least one media access control layer. The network layer, media access control layer, and physical layer each function as separate modules. The media access control chip does not require packet level media access control functions to be implemented in the same physical location. See also United States Patent Publication No. 20040045035 to Cummings, et al. published Mar. 4, 2004 entitled "Distributed cable modem termination system (CMTS) architecture," and United States Patent Publication No. 20050002331 to Nolle, et al. published Jan. 6, 2005 and entitled "Predictive upstream load balancing" discloses the static balancing of cable modems across upstream channels which are made based on the channel's current bandwidth demand compared to a first and/or second CAC threshold level. If both threshold levels are exceeded, the modem is assigned to the channel having the lowest bandwidth demand. After registration, predictive balancing modems according to whether an MTA is part of a given modem avoids concentration of modems having MTAs on certain channels while other channels serve only modems without MTAs. Modems are also predictively balanced according to whether they have associated a DSA_use_history profile. Modems associated with certain subscribers may be balanced according to the time of day balancing is occurring based on the profile. Thus, light user's during working hours may be balanced as heavy user's at night if they typically download video content or use VoIP features during the evening_

"Switched" Architectures

One emerging technology useful for efficiently delivering video and other content to network subscribers comprises so-called "switched" or "broadcast switched" architectures. These systems make use of the fact that while a given number of channels of programming or content must be made available to a given pool of subscribers, not all of these channels (and in fact, not even most of these channels) are required to actually be delivered to subscribers at any given time. Rather, only a fraction of these channels are requested. Hence, the use of "intelligent" and prompt switching of these channels can obviate the need to deliver all of the channels simultaneously; only those channels actually being viewed or requested are switched onto the QAMs for delivery to the appropriate subscribers.

However, such switched functionality has heretofore only been applied to more traditional broadcast video as opposed to packetized IP media traffic, such as the multicast traffic previously described (which includes so-called "IP-TV").

Despite the foregoing wide variety of packetized media processing and delivery techniques evidenced in the prior art, there is still a salient need for improved apparatus and methods for distributing multicast IP or other packetized content over a content-based (e.g., cable) network in an efficient and flexible manner. Such apparatus and methods would ideally leverage existing infrastructure and require little in the way of network modification in order to be implemented, yet provide network operators with the ability to deliver multicast traffic (including relatively high bandwidth video content) to multiple network users without monopolizing numerous downstream channels.

The improved apparatus and methods would also ideally be adaptable to varying types of network architectures, including those of the digital "switched broadcast" variety, and leverage the inherent attributes of these networks to provide even more efficient delivery of packet services.

SUMMARY OF THE INVENTION

The present invention satisfies the foregoing needs by providing, inter alia, efficient multicasting in a system incorporating multiple physical channels.

In a first aspect of the invention, a method of operating a network is disclosed. In one embodiment, the network comprises a content delivery network comprising at least one distributing device, the distributing device being configured to distribute a plurality of packetized data streams, a plurality receiving devices being configured to receive the plurality of packetized data, and a plurality of physical channels providing communication from the at least one distributing device to the plurality of receiving devices, and the method comprises: transmitting to at least a portion of the plurality of receiving devices a map relating individual ones of multicast transmissions to respective ones of the set of physical channels; receiving a request from at least one of the at least portion of the plurality of receiving devices for at least one of the packetized data streams being transmitted in a first one of the multicast transmissions; and causing the at least one receiving device to process a physical channel corresponding to the first one of the multicast transmissions to obtain access to the at least one packetized data stream.

In a second embodiment, the network comprises a content distribution network comprising a node, a plurality of modems, and a plurality of physical channels providing communication between the node and the modems, and the method comprises: transmitting multicast transmission information from the node to at least a portion of the modems, the information relating the multicast transmissions and at least one corresponding physical channel on which each multicast transmission is transmitted; receiving a request to receive a first of the multicast transmissions; and configuring at least one of the modems to process a physical channel associated with the first multicast transmission based at least in part on the information.

In a second aspect of the invention, a method for providing Internet Protocol (IP) packetized data to a plurality of network subscribers in a content delivery network is disclosed. In one embodiment, the method comprises: transmitting the IP packetized data to a first one or more of a plurality of modems in communication with the network over a first one of a plurality of physical channels, the first one or more modems being associated to at least a first group of one or more of the plurality of network subscribers; transmitting the IP packetized data to at least a second one or more of the plurality of modems in communication with the network over a second one of the plurality of physical channels, the second one or more modems being associated to at least a second group of one or more of the plurality of network subscribers; and switching the second one or more modems to the first one of the plurality of physical channels. The act of switching enables both the first and second one or more modems to receive the IP packetized data in a substantially multicast fashion from the same physical channel.

In a third aspect of the invention, apparatus for processing network traffic is disclosed. In one embodiment, the apparatus comprises: a digital signal processing unit capable of processing data from a plurality of physical channels; and a control unit configured to: process a request to receive a packetized content stream on a first physical channel; cause the digital signal processing unit to process the first physical channel; receive a message to switch from the first physical channel to a second physical channel, the second physical channel providing a multicast of the packetized content stream; and cause the digital signal processing unit to process the second physical channel, and cease the processing of the first physical channel. The message to switch from the first to the second physical channel is received only after it is determined that the packetized content stream has been previously established on the second physical channel.

In a fourth aspect of the invention, a method for operating a device configured to receive Internet Protocol (IP) video content is disclosed. In one embodiment, the content is received via a modulator/demodulator interface, and the method comprises: receiving the IP video content carried via a first plurality of radio frequency (RF) channels, the first plurality of RF channels capable of being demodulated by the interface, receiving information used as a basis of switching the device to a second plurality of RF channels, the IP video content being carried via the second plurality of RF channels, the first plurality of RF channels having one or more channels that are not part of the second plurality of RF channels, and switching the device to demodulate the second plurality of RF channels and receive the IP video content. The delivery of the LP video content on the first plurality of RF channels is ceased after the switching has been completed in order to conserve bandwidth. At least one other device is simultaneously receiving the IP video content on the second plurality of RF channels.

In another embodiment, the method comprises: receiving the IP video content carried via a first radio frequency (RF) channel, the first RF channel being capable of being demodulated by the interface; receiving information used as a basis of switching the device to a plurality of second RF channels, the IP video content being carried via the plurality of second RF channels; and switching the device to demodulate the plurality of second RF channels and receive the IP video content; wherein the delivery of the IP video content on the first RF channel is ceased after the switching has been completed in order to conserve bandwidth; and wherein at least one other device is simultaneously receiving the IP video content on the plurality of RF second channels.

BRIEF DESCRIPTION OF THE DRAWINGS

FIG. 4a is a graphical representation of one exemplary format for the table mapping message (TMM) of the invention.

DETAILED DESCRIPTION OF THE INVENTION

Figure 1:
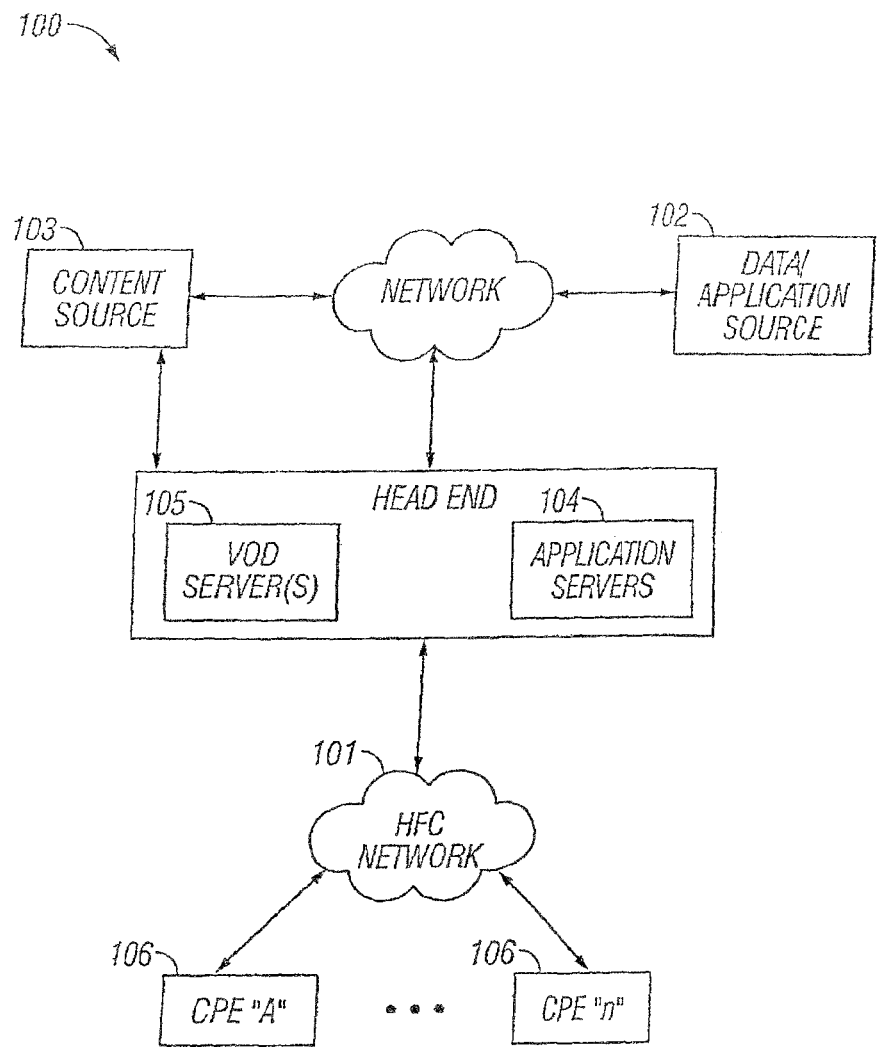
FIG. 1 is a functional block diagram illustrating an exemplary ITC cable network configuration useful with the present invention.

Reference is now made to the drawings wherein like numerals refer to like parts throughout.

As used herein, the terms "user channel" and "program channel" are all generally synonymous with the concept of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to said schemes.

As used herein, the term "Service Group" refers to either a group of service users (e.g. subscribers) or the resources shared by them in the form of entire cable RF signal, only the RF channels used to receive the service or otherwise treated as a single logical unit by the network for resource assignment.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internees, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the terms "Internet" and "interne." are used interchangeably to refer to inter-networks including, without limitation, the Internet.

As used herein, the term "head-end" refers generally to a networked system controlled by an operator (e.g., an MSO) that distributes programming to MSO clientele using client devices. Such programming may include literally any information source/receiver including, inter alta, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, set-top boxes (e.g., DSTBs), personal computers (PCs) and minicomputers, whether desktop, laptop, or otherwise, and mobile devices such as handheld computers, PDAs, and smartphones.

Similarly, the terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), whether stand-alone or integrated with other devices, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "server" refers to any computerized component, system or entity regardless of form which is adapted to provide data, files, applications, content, or other services to one or more other devices or entities on a computer network.

Overview

The present invention provides, inter alia, methods and apparatus directed to eliminating or reducing wasted bandwidth associated with multicasting packetized content (including video or another such sizable transmission), and thereby increasing the overall efficiency of the content-based network.

In one exemplary embodiment, the system of the present invention utilizes a "switched digital" approach to (i) deliver packetized content only when requested, and (ii) selectively switch cable modems (CMs) or other such CPE to and from certain downstream channels (e.g., DOCSIS QAM-modulated RF channels) based on switching algorithms. These algorithms make use of the fact that in a typical "switched" environment, only a fraction of the available program channels are actually in use; hence, intelligent and timely switching of individual subscribers (or groups of subscribers) can allow for a great reduction in the number of downstream channels that must be allocated to delivery of the content.

In the exemplary DOCSIS environment, the subscriber's cable modems are switched selectively among different downstream QAMs in similar fashion to the switched video previously described, thereby allowing for reduction in the total number of QAMs required to service the DOCSIS functionality (which may include both traditional IP-based network services, as well as high-bandwidth video or "IP TV" content). Advantageously, these cable modems can be rapidly switched with no re-ranging or registration, thereby allowing for a substantially seamless and low-overhead switching transient which is transparent to the user.

The foregoing approach is particularly useful in the content of IP or similar "multicast" content that is targeted for multiple subscribers. Under the prior art, multicasting of such content would consume significant amounts of bandwidth on the downstream channels, since the multicast content was essentially replicated for each different subscriber. In contrast, the improvements provided by the present invention allow this multicast content to be delivered to multiple subscribers by selectively tuning the subscribers to common channels where the content is already being delivered to other subscribers, thereby allowing for a 1:N expansion of the content with minimal if any replication.

In one exemplary variant of the invention, individual CPE are configured to perform the switching in a substantially autonomous fashion (e.g., based on broadcast downstream messages that provide information relating to the channel mapping of certain packetized content), thereby obviating any upstream signaling or messages.

The foregoing improvements provided by the invention can also be implemented in varying types of network architectures, including without limitation traditional cable (HFC) networks, and the more recent broadcast switched architecture (BSA) type. Minimal modifications to these networks (and the subscriber's CPE) are advantageously required in order to implement this functionality. For example, in the case of the BSA network, the DOCSIS switching capability can be readily piggy-backed onto the existing video switching apparatus and algorithms, thereby obviating expensive retrofits and hardware changes.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable architecture having an multiple systems operator (MSO), digital networking capability, and plurality of client devices/CPE, the general principles and advantages of the invention may be extended to other types of networks and architectures where bandwidth conservation is required or desirable, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system or over future satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

It is further noted that while described primarily in the context of 6 MHz RF channels, the present invention is applicable to literally any frequency/bandwidth, such as for example 8 MHz channels. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Also, while described primarily in the context of the well-known Internet Protocol (described in, inter glia, RFC 791 and 2460), it will be appreciated that the present invention may utilize other types of protocols (and in fact bearer networks to include other internets and intranets) to implement the described functionality.

Network—

FIG. 1 illustrates a typical content-based network configuration with which the packet multicasting methodology of the present invention may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. Such CPEs 106 comprise processors and associated computer memory adapted to store and run the downloaded or resident application, as well as receive the streamed in-band content. These may take the form of digital set-top boxes (DSTBs) or the like. The CPE 106 may also comprise a cable modem for processing Internet or other packetized traffic.

Figure 1A:
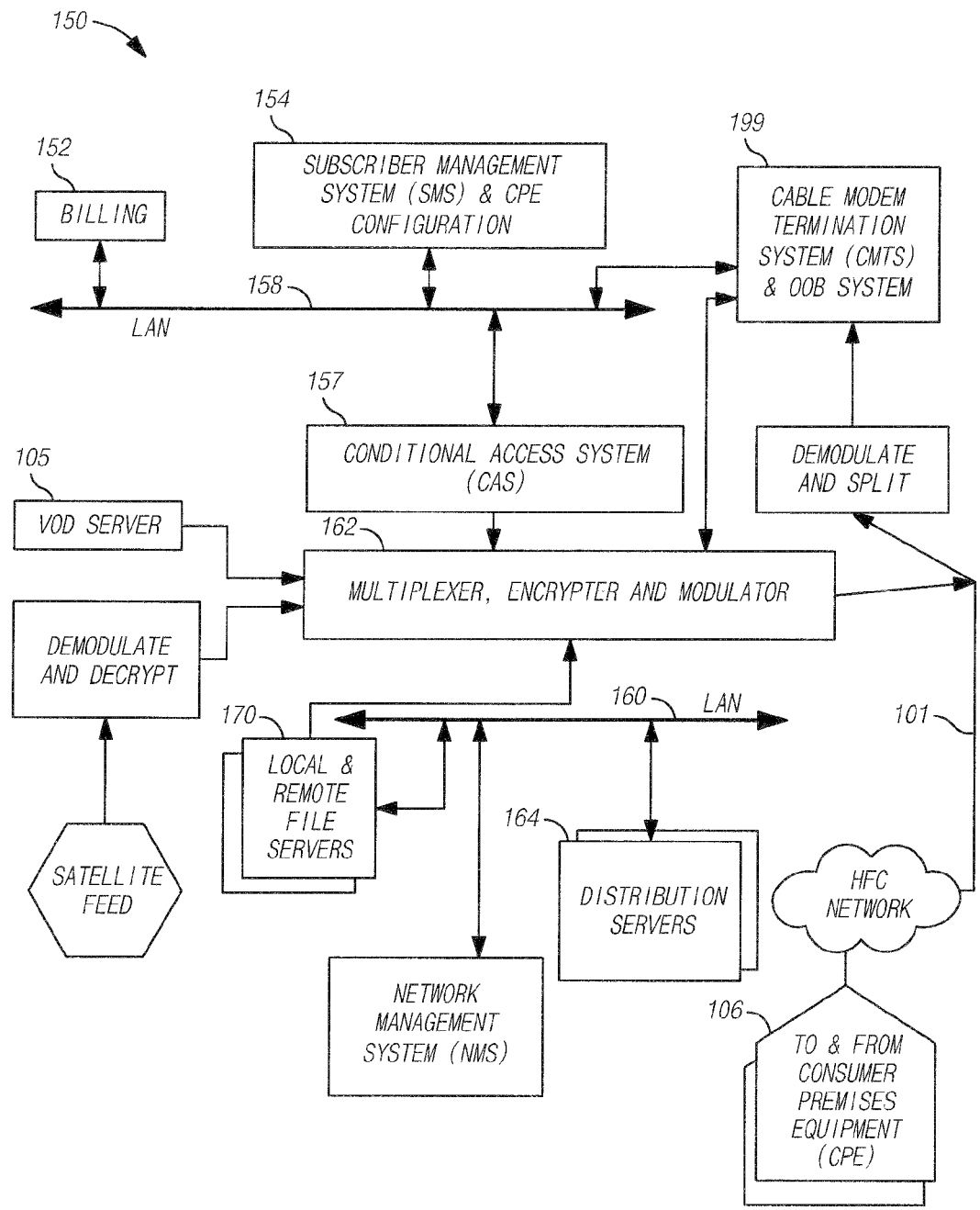
FIG. 1a is a functional block diagram illustrating one exemplary HFC cable network head-end configuration useful with the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and OOB system 199, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (FIG. 1b) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0, 2.0 (and subsequent) specification provides for exemplary networking protocols both downstream and upstream, although the invention is in no way limited to these exemplary approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
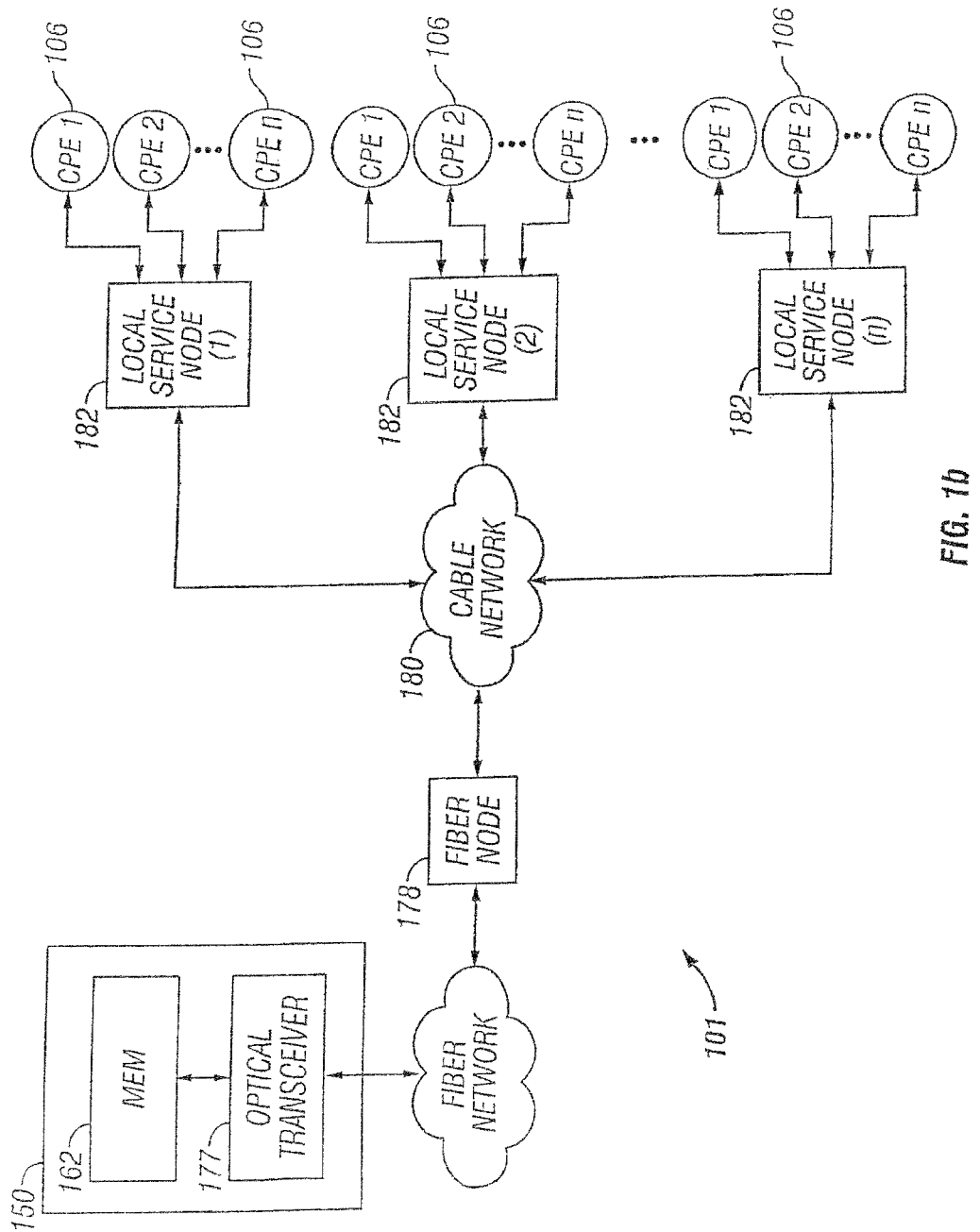
FIG. 1b is a functional block diagram illustrating one exemplary local service node configuration useful with the present invention.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks—

Figure 1C:
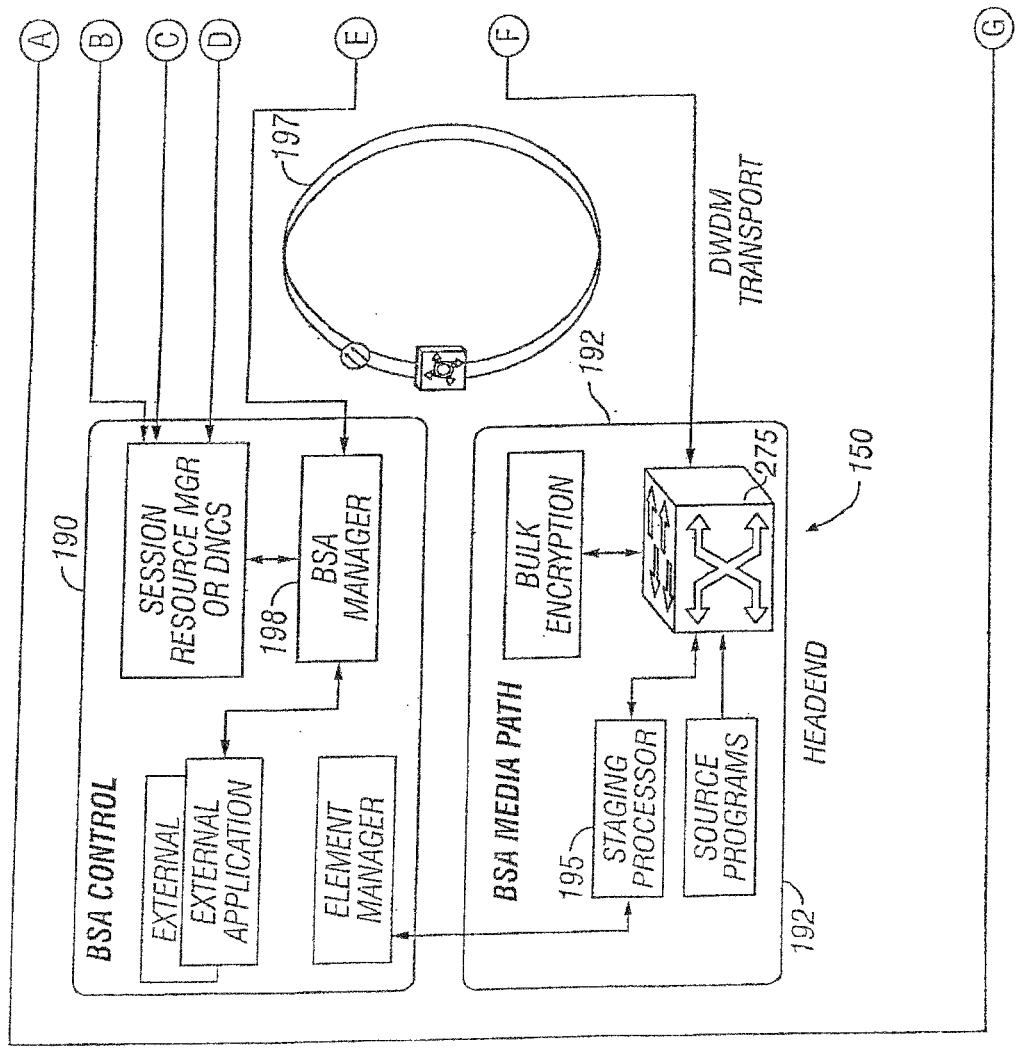
FIG. 1c is a functional block diagram illustrating one exemplary broadcast switched architecture (BSA) network useful with the present invention.
Figure 1C:
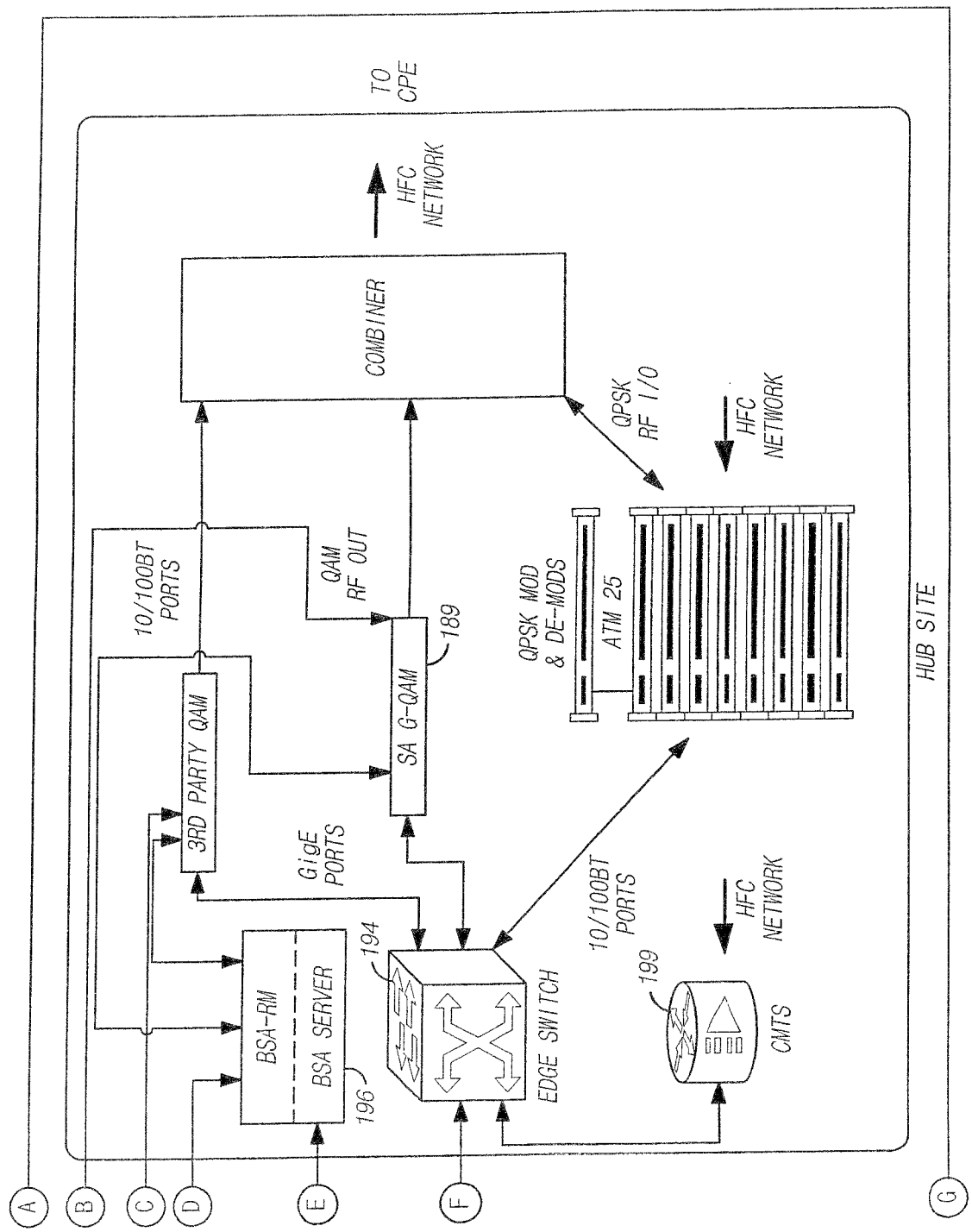

FIG. 1c illustrates an exemplary "switched" network architecture useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the head-end 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to anticipatory switching and bandwidth conservation (in conjunction with a management entity 198 disposed at the head-end). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique For Effectively Providing Program Material In A Cable Television System", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a-1c also deliver Internet data services using the Internet protocol (IP), although other protocols and transport mechanisms of the type well known in the digital communication art may be substituted. As previously described, one exemplary delivery paradigm comprises delivering MPEG-based video content, with the video transported to user PCs (or IP-based STBs) over the aforementioned DOCSIS channels comprising MPEG (or other video codec such as 11.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1e, the IP packets associated with Internet services are received by edge switch 194, and forwarded to the cable modem termination system (CMTS) 199. The CMTS 199 examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It will be appreciated that while the exemplary embodiments presented herein are described in the context of Internet services that include multicast and unicast data, the present invention is applicable to other types of services that include multicast transmission of data delivered over a network having multiple physical channels or even virtual or logical channels. For example, switching between various physical channels that comprise a virtual channel, can itself be conducted according to the "switched" approach of the present invention. As a simple illustration, if a first virtual channel is comprised of physical channels (e.g., QAMs) A, B and D, and a second virtual channel is comprised of QAMs C, E and F, a CM or other CPE can be configured to switch between the A/B/D and C/E/F virtual channels as if they were a single QAM.

Figure 2:
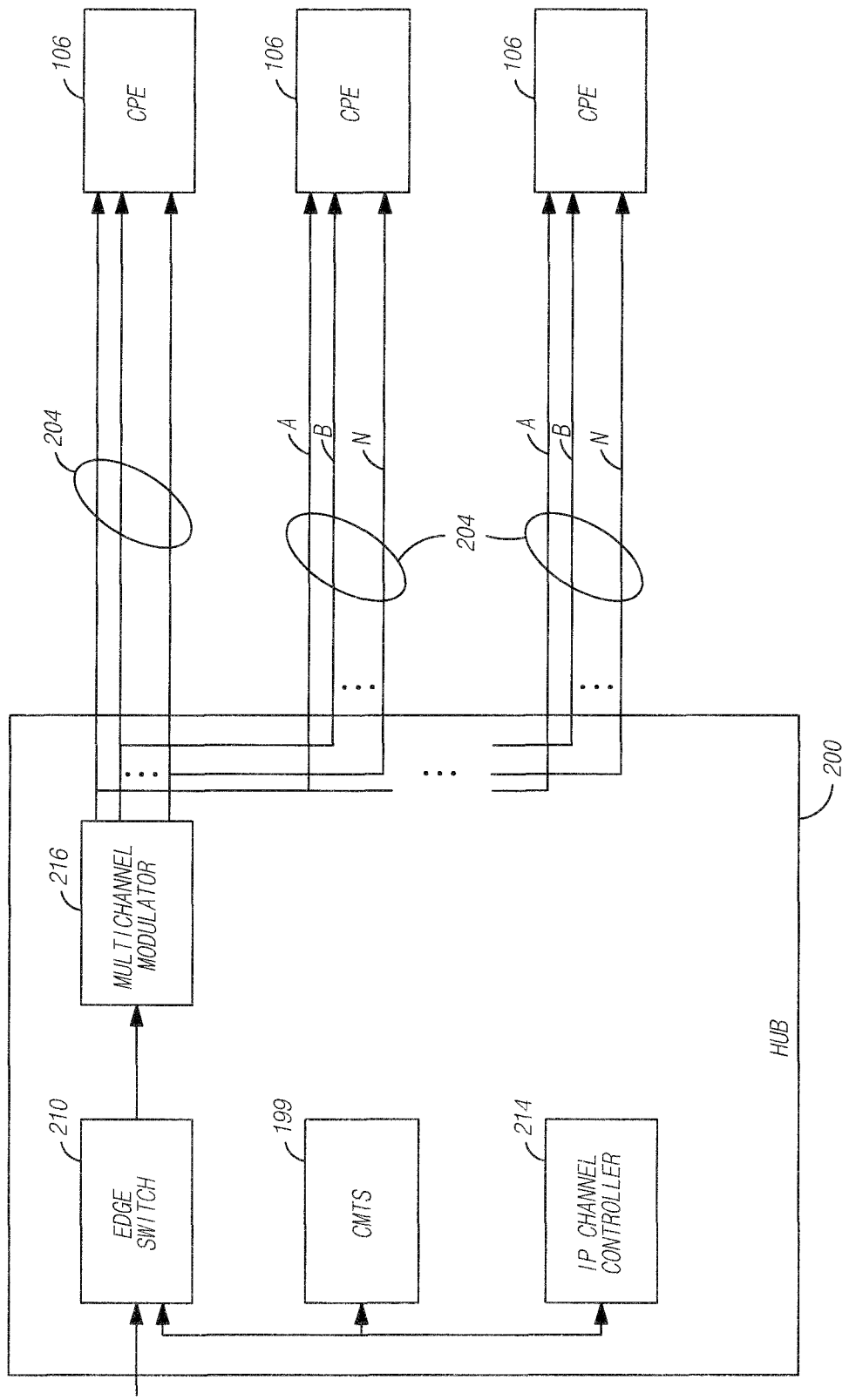
FIG. 2 is a block diagram of an exemplary hub and associated cable modems configured in accordance with one embodiment of the invention.

FIG. 2 is a simplified logical diagram of a cable network that more clearly illustrates the invention. The hub 200 is coupled to a plurality of customer premise equipment (CPEs) 106, each via a set of physical channels 204. The physical channels are typically 6 MHz radio frequency channels each centered at different frequencies. The RF channels are typically carried via coaxial cable to the customer premises, although other approaches (such as FTTH) may be utilized.

The use of other types of physical channels is also consistent with the invention, including light in optical fiber and broadcast RF or light signals (wireless). Time division and/or code division channels (or yet other access techniques) may also be used. Additionally, completely separate physical media may be used such as multiple fiber optic cables or multiple coaxial cables linked to the same customer site or CPE 106. Heterogeneous mixes of the foregoing physical and/or logical approaches may also be employed, as will be appreciated by those of ordinary skill.

In the exemplary embodiment of the invention, the CPE 106 comprise cable modems, although other devices capable of receiving the transmitted signals may be used. The subscriber typically will have additional equipment such as set top boxes (STBs), routers, computers or other client devices on the premises that may receive IP traffic via (or even in tandem with) the cable modem. For example, the end destination of IP multicast traffic may be a mobile device which is in wireless communication with the CM via a wireless gateway or router (e.g., WiFi, Bluetooth, or PAN) device.

The exemplary hub 200 of FIG. 2 includes an edge switch 210, cable modem termination switch 212, and IP channel controller 214. IP channel control typically comprises software running on a microprocessor, although other approaches (including hardware and firmware) may be employed if desired. Software, however, allows for flexible modifications and upgrades, such as where operational or business rules are changed.

While the illustrated embodiment shows an IP channel controller 214 within the hub 200, the placement of the IP channel controller 214 at other locations is consistent with other embodiments of the invention. For example, the channel controller 214 may comprise a distributed system with a portion located in a hub 200 and a portion located at the head-end or other network node. However, the hub 200 is a preferred location for IP channel controller as it is proximate to the CMTS 199.

The configuration of, and communication between, the various components that make up the exemplary network of FIG. 2 are performed primarily through control and/or configuration messages. For example, the IP channel controller 214 may exchange control messages with the CMTS 199 in order to allocate certain IP traffic to certain QAMs, and so forth. The use of such control/configuration messages that are exchanged between the various systems as is well known in the art; these message protocols are typically present within the system to begin with, and hence provide a ready mechanism for support of the various functions of the present invention.

In one variant, the CMTS 199 configures the CPE 106 via one or more configuration messages to receive IP traffic on different physical channels 204. For example, the CMTS 199 will configure a first subset of cable modems which it serves to receive IP traffic on physical channel A (as designated by its Channel ID or similar parameter), and configure a second subset of cable modems to receive IP traffic on physical channel B. The CMTS 199 then forwards the packets received from an upstream source to the corresponding physical channel via, e.g., the edge switch 194.

During operation, the CPE 106 each monitor the assigned physical channel 204 for IP traffic intended for the subscriber (s) they service. This monitoring is accomplished in one embodiment by processing the IP packets received over the physical channel, and looking at the IP address or other identifier (e.g., socket or port identifier) contained therein. Packets with an IP address assigned to the relevant customer site are forwarded to the equipment located at that customer site. Other traffic is ignored. This "packet filtering" function may also be performed by a router or other such device in communication with the CPE 106.

As described above, subsets of CPE 106 can be assigned to different physical channels 204. Thus, a first subset of CPE 106 will monitor channel A, and a second subset of CPE will monitor channel B. Assigning different physical channels 204 to different sets of CPE 106 reduces the processing required for any given CPE 106. Specifically, IP packets transmitted on non-assigned physical or logical channels are never received by the respective CPE 106, and therefore no computing resources are consumed examining or processing those packets. Also, the digital signal processing required to process a single physical channel is less than that required to process multiple physical channels; hence, the CPE or other processing entity can be "thinner" in terms of processing power and hardware capability.

The IP traffic received by the CPE 106 also includes broadcast and multicast packets (herein referred to collectively as multicast IP packets or multicast transmissions). Multicast IP packets are packets directed to multiple destinations, which may include multiple CPE 106. Multicast IP packets typically carry video and/or audio information (e.g., program streams) that is likely to be viewed simultaneously by multiple users, or data information (such as, e.g., streaming stock quotes).

In one embodiment of the invention, the IP channel controller 214 monitors the incoming and/or outgoing IP traffic for multicast transmissions. The IP channel controller 214 tracks the particular CPE 106 receiving those multicasts, as well as the physical channels 204 to which each CPE is assigned. The tracking is typically accomplished by monitoring messages generated by the CPE, including requests to initiate the receipt of a multicast transmission; however, other approaches may be used.

As described in greater detail subsequently herein, if the IP channel controller 214 detects that two CPE 106 are receiving the same multicast transmission, it then determines if those two CPE 106 are receiving the multicast IP traffic on the same physical channel.

If the two CPE 106 are receiving traffic on different physical channels, the IP channel controller 214 will instruct one of the CPE 106 to switch over to the other physical channel 204, thereby placing both CPE on the same channel. Additionally, the IP channel controller 214 instructs the CMTS 199 to place the corresponding unicast IP traffic destined for the second device, and cancel the second multicast transmission if established.

For example, in one configuration, a first CPE 106 is receiving IP traffic on physical channel (e.g., QAM) A and a second CPE 106 is receiving IP traffic on a physical channel B. These two CPE 106 may also be receiving the same multicast transmission. If so, the IP channel controller 204 will switch the second CPE 106 to physical channel A (or vice versa) so that a single multicast transmission may be shared by both CPEs 106. It will also configure the CMTS 199 to transmit the unicast IP traffic destined for or addressed to the second CPE 106 on physical channel A, and to cancel the second multicast transmission, if established.

By placing both CPE 106 on the same physical channel, the IP channel controller 214 increases the efficiency of the network. In particular, the IP channel controller 214 eliminates the need to place the same IP multicast transmission on two different physical channels. This reduces the overall network traffic loading, and therefore increases the capacity of the network. IP multicasts can be very data intensive, particularly when video multicasts are involved, thus the network savings can be substantial. The greater the bandwidth consumed by the multicast, the greater the benefits provided by the "leveraging" of the present invention.

In one embodiment of the invention, the IP channel controller 214 may also assist in load-balancing functions. For example, the controller may determine which physical channel is more heavily loaded with IP traffic. It can then selectively switch a given CPE 106 assigned to the more-loaded physical channel to the less-loaded physical channel used by another CPE 106. In this case, the multicast transmission will be switched from first channel to the second channel. This assists with balancing the network load by distributing IP traffic across the available QAM pool. However, it will be recognized that in certain cases, it may be desirable to load up a given channel at or near its limit, such as to permit elimination of lightly loaded DOCSIS QAMs that can be replaced with additional downstream content channels (such as during particularly high peak viewing times).

It will also be recognized that the foregoing functionality may be applied with more than two channels/CPE. For example, if two CPE 106 are already receiving a multicast transmission on a first physical channel 204, and a third CPE 106 assigned to a different physical channel 204 is detected receiving the same multicast transmission, the IP channel controller will switch the third CPE 106 to the first physical channel. This reduces the number of CPE 106 that are required to switch physical channels; i.e., as compared to switching the two commonly tuned CPE to the channel of the third CPE. Hence, the invention can be configured to analyze the existing CPE/channel allocation, and determine the most efficient switching strategy that reduces switching transients (and hence overhead).

In another embodiment of the invention, the IP channel controller 214 tracks the state of all multicast programming requested by a set of CPE 106 that share a set of physical channels 204. If a first CPE 106 using a first physical channel 204 selects the same set of multicast transmissions as a second CPE 106 using a second physical channel 204 (as determined by, e.g., an upstream message), the IP channel controller will instruct the CMTS to cause the second CPE 106 to switch to the first physical channel. The switched CPE can then receive the same multicasts without transmission of any additional information in the network.

It is noted that the exemplary embodiments of the present invention provide two-fold benefits in terms of bandwidth conservation; i.e., (i) the selective switching "on" of the downstream DOCSIS channels only when they are required by one or more users being serviced by that node (e.g., hub), and (ii) the "compression" of what would otherwise be two or more separate multicast streams delivered to two or more cable modems into one stream, thereby obviating replication of the multicast content.

In terms of channel allocation and capability, video trials conducted by the Assignee hereof have demonstrated that given an exemplary channel lineup of some 200 video programs and a grouping of households containing approximately 250 set top boxes, a maximum of about 40 video channels will be simultaneously consumed by CPE distributed among those households.

Recall that to replicate 200 video programs over DOCSIS requires 8 DOCSIS downstream channels. In order to transmit 40 video channels, only 2 DOCSIS downstream channels would be necessary (40 streams at 1.5Mbps=60 Mbps/40 Mbps per DOCSIS downstream=2 downstreams). Thus, for a DOCSIS-based video distribution platform, a better solution is to perform switching of the video over a smaller number of DOCSIS 2.0 downstream channels. A DOCSIS 2.0 CM is capable of performing very quick downstream channel changes (DCC), which allows the CM to switch between the multiple DOCSIS downstream channels on which the video content is broadcast. It is also advantageously possible to perform these downstream channel changes without requiring the CM to re-range and re-register.

In a broadcast switched video environment, the switching controller receives requests for video from a video display application (e.g., running on the subscriber's CPE), determines whether that requested video is already being broadcast to the group of subscribers which includes the requester, and determines on which of the available QAMs it should be broadcast. In the DOCSIS video environment, assuming that all CPE 106 in a given premises share a single CM to access the video, and that single CM is limited to receiving video on a single DOCSIS downstream at any one time, the channel controller 214 is tasked with keeping track of all channels currently being watched by each premises or household and ensuring that all channels for each household are available on one of the DOCSIS downstreams. This can lead to some loss of statistical multiplexing gains, as some video programs will have to be made available on multiple DOCSIS downstreams simultaneously, but this would only be a temporary condition, and can be managed and also offset with other techniques. As homes "tune away" from a given channel, those video programs can be removed by the controller 214 from the appropriate DOCSIS downstream channel.

It will also be recognized that the present invention differs from conventional "IP-based multicast" of type known in the prior art in that the present invention creates CMTS/CM pairing(s) to cause the CM to change which DOCSIS downstream from which it receives the multicast content.

In addition, while a simple prior art multicast rendezvous point simply creates and destroys tree branches as clients join and leave a multicast, the controller 214 of the present invention must keep the state of all video programming requested (by household) for each of those households that share the pool of DOCSIS downstream channels on a particular CMTS 199. For example, if a given household is using downstream channel B, and then selects the same combination of video programs that another household is receiving on channel A, then the first household's cable modem will be instructed by the controlling entity (e.g., by the CMTS 199 or controller 214, or the CPE itself via broadcast status messages as described subsequently herein) to switch to channel A. For example, in one embodiment, the controller 214 tells the appropriate CMTS 199 via inter-component messaging to instruct the appropriate CM (via a separate downstream message addressed to that CM) to make this channel change.

Methods—

Figure 3:
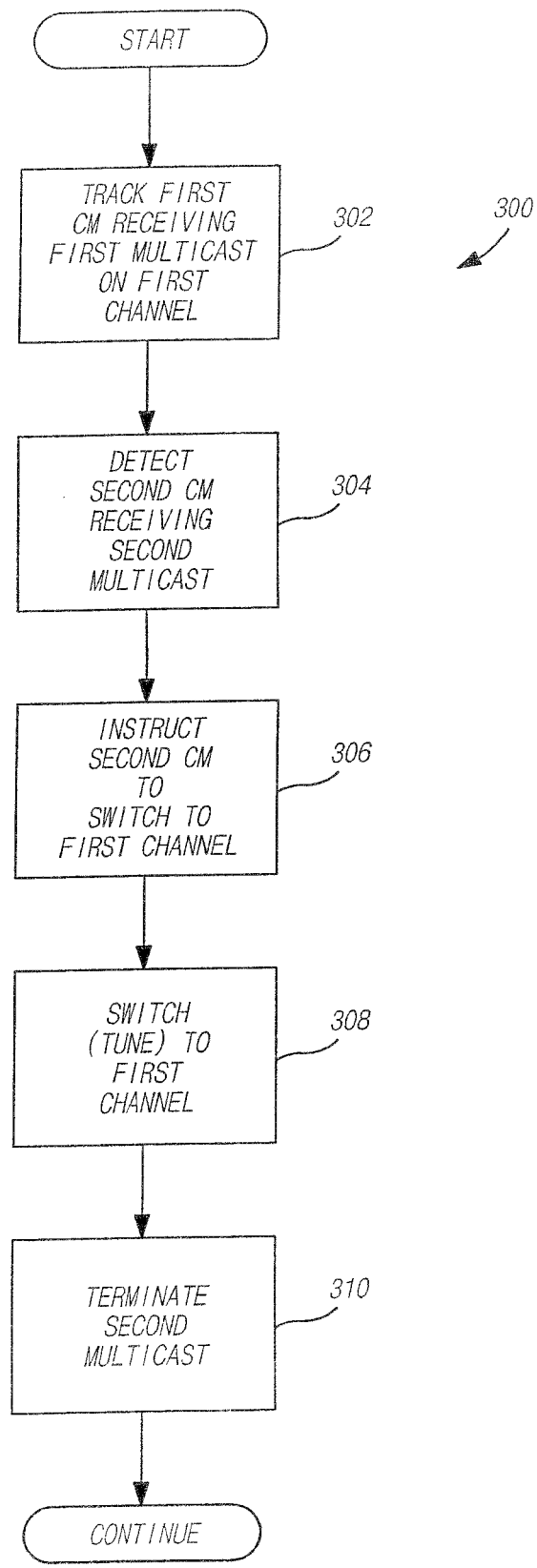
FIG. 3 is a logical flow chart illustrating a first exemplary embodiment of the method of channel switching in accordance with the invention.

Referring now to FIG. 3, a first exemplary method of operating a network according to one embodiment of the invention is described in detail. The method 300 begins at step 302 wherein a first cable modem or other CPE is associated with and receives a first multicast transmission on a first physical channel. Per step 304, a second cable modem is detected receiving (or requesting to receive) the multicast transmission on a second physical channel.

Per step 306, the second cable modem is instructed to switch to the first physical channel. In response, at step 308, the second cable modem switches to begin processing its own (dedicated or unicast) IP packets as well as the requested multicast packets on the first physical channel. The IP traffic destined for or addressed to the second cable modem is also switched to the first physical channel in anticipatory or substantially contemporaneous fashion, so as to minimize the possibility of packet loss (and hence the need for subsequent retransmission).

Per step 310, the multicast transmission on the second physical channel is terminated (if in progress), thereby freeing up bandwidth on the second physical channel, or allowing for its elimination if no other bandwidth of that channel is currently being utilized.

Figure 4:
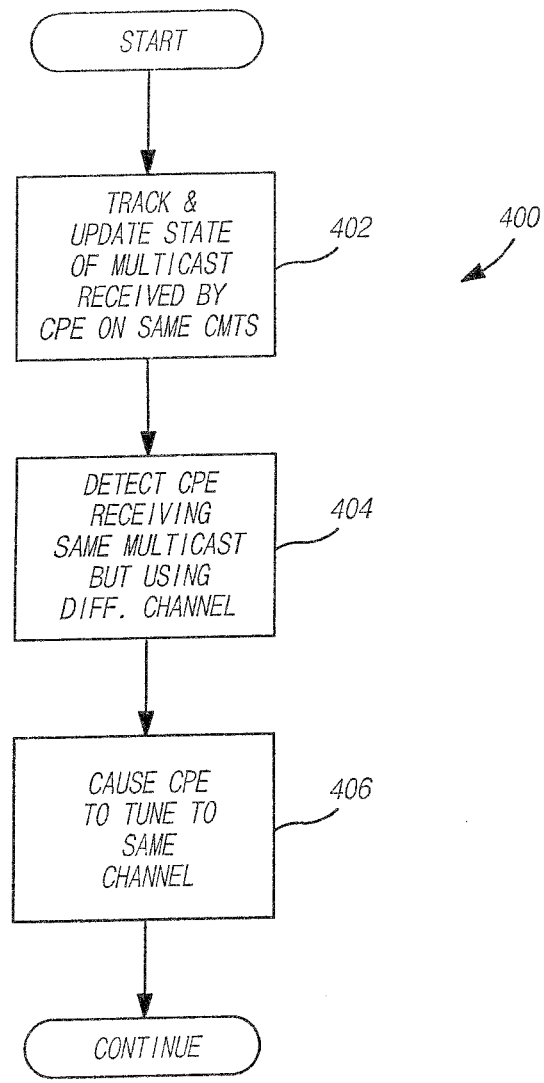
FIG. 4 a logical flow chart illustrating a second exemplary embodiment of the method of channel switching in accordance with the invention.

FIG. 4 is a flow chart illustrating another exemplary method 400 of network operation performed in accordance with another embodiment of the invention. The method 400 begins at step 402, wherein the state of all the multicast transmissions received by the set of CPEs 106 (e.g., cable modems or CM equipped DSTBs) that share a CMTS is tracked and updated. This updating may be anecdotal, periodic, or upon the occurrence of another event (such as an upstream communication or request from a CPE)

At step 404, a CPE 106 is detected that is receiving, or requesting to receive, a set of multicast transmissions that is the same as a first CPE 106, but using a different physical channel. Per step 406, the new CPE is instructed to switch to the (different) physical channel used by the first CPE 106, and the CMTS 199 is configured to forward all IP traffic addressed to that CPE (or other entities in its network if acting in a router or gateway capacity) on the new physical channel. Any multicast transmissions established on the first physical channel used by the detected CPE are terminated. The process is then terminated (step 408).

In similar fashion to the method 300 of FIG. 3, the method 400 of FIG. 4 uses the network bandwidth more efficiently by, inter alia, (i) instructing a CMTS/CM pairing to cause the CM to change which downstream (e.g., DOCSIS) channel it receives content from; and (ii) selectively reallocating or tearing down unused channels. In a particular salient aspect, the exemplary methods reduce the number of multicast transmissions on the network by placing CPEs (e.g., CMs) receiving the same set of multicast transmissions on the same physical (or virtual) channel.

It will also be recognized that the methods of the present invention may be used with those described in co-owned and co-pending U.S. application Ser. No. 11/013,671 entitled "METHOD AND APPARATUS FOR WIDEBAND DISTRIBUTION OF CONTENT" filed Dec. 15, 2004 which is incorporated herein by reference in its entirety. Specifically, in one embodiment, the aforementioned physical channels or QAMs established between the hub (or head-end or other network agent) and the CPE/CM can comprise a wideband multiplex if desired. In this capacity, the virtual channel provided by wideband multiplex acts essentially as a single QAM (while also affording the numerous benefits described in the aforementioned disclosure, including increased multiplexing efficiency). Various combinations and implementations of the invention incorporating wideband capability will be recognized by those of ordinary skill in the art, provided the present disclosure.

In certain applications, there is also a desire to allow the IP STB/PC to continue to receive video programming even in the event that the DOCSIS upstream channel becomes unavailable or is impaired. Hence, in another embodiment of the invention, the controller 214 periodically sends out a table mapping message (TWA) or similar communication to the requesting (e.g., video) application on the end-user device, e.g., IP-enabled STB or PC, or alternatively to the CPE (i.e., CM) itself. This TMM provides the mapping of video programs to DOCSIS downstream channel ID and multicast address. FIG. 4a illustrates one exemplary format for the TMM of the invention. Even if a CPE or associated PC is unable to send a "join" message, it can use the information in the TMM to determine whether a requested video program is currently available on the DOCSIS downstream channel to which it is currently tuned. The CPE/PC is also configured to indicate the appropriate behavior if a video program is only currently available on another DOCSIS channel. If the upstream DOCSIS channel is unavailable, the CM can be programmed to tune itself to a different DOCSIS downstream to receive the video programs (whether automatically or according to some other logical control algorithm). Likewise, the CM can be programmed to use a different DOCSIS upstream for communication.

Figure 5:
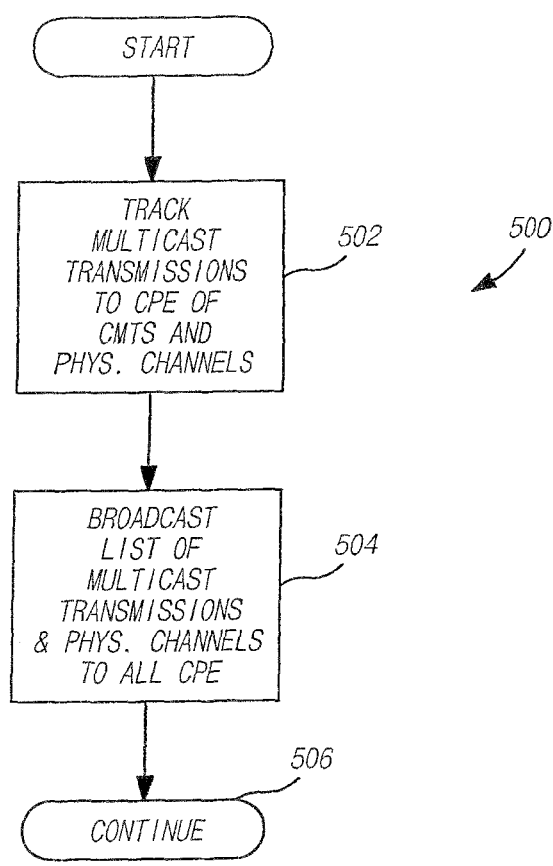
FIG. 5 is a logical flow chart illustrating a third exemplary embodiment of the method of channel switching in accordance with the invention.

FIG. 5 is a flow chart illustrating an exemplary method of operation according to aforementioned logic. The method 500 begins at step 502, wherein the multicast transmissions to the CPEs associated with a particular CMTS are tracked along with the physical channels on which those multicast transmissions are located. Per step 504, a list of the multicast transmissions and the associated physical channels are broadcast to the CPE 106 associated with the particular CMTS. This process is repeated periodically in the illustrated embodiment, but may be performed according to any other number of schemes including, without limitation, (i) anecdotally (i.e., upon the occurrence of a specific event or sequence of events), (ii) upon receipt of a request, such as an upstream message from one or more CPE 106, or alternatively another network agent (e.g., server), or (iii) based on one or more monitored parameters (e.g., available downstream bandwidth, CM activity level, etc.), and so forth.

By broadcasting a list of multicast transmissions and the associated physical channels on the downstream QAMs, this embodiment 500 of the method allows one or more CPE 106 to switch to a different physical channel without sending a message to the hub 200 (although one or more messages may be sent if desired). For example, when a local request is received by a CPE 106 to start viewing a multicast transmission contained in the list, that CPE can switch to the corresponding physical channel without sending a message to the hub 200. By using the broadcast message to determine which physical channel contains the desired multicast transmission, the CPE can perform this switch almost instantaneously (and hence avoiding any perceptible latency by the user or any associated application running on the CPE 106, including retransmission requests and transmissions for any dropped packets) on its own without having to generate a request to an IP channel controller or CMTS. This is particularly useful where there is no upstream link available due to outage or other impairment, or upstream bandwidth is otherwise constrained or delayed. It is also advantageously enables the use of "listen only" devices that may operate or functionally act to receive data from the network only, or which cannot otherwise meet protocol, timing, or other requirements for upstream communications.

As previously noted, the CPE may also be programmed to search for or try other upstream communication channels before invoking the aforementioned method. For example, the method of FIG. 5 may be selectively employed only after it has been determined that no upstream channel is available, thereby obviating the periodic broadcast messages until they are required.

Figure 6:
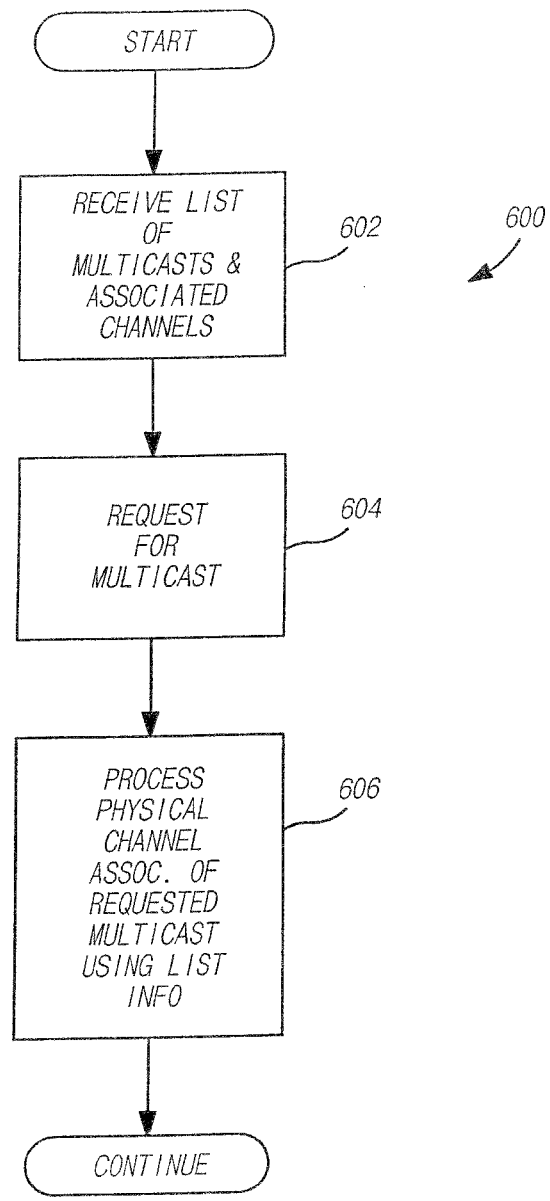
FIG. 6 is a logical flow chart illustrating a fourth exemplary embodiment of the method of channel switching in accordance with the invention.

FIG. 6 is a flow chart illustrating yet another embodiment of the operating methodology of the invention. The method 600 of FIG. 6 begins at step 602, wherein a list of multicast transmissions and the associated physical channels for those transmissions is received. These messages are typically received by a CPE 106, although other network entities or agents (whether interposed between the CPE and the transmitting entity, or otherwise) may be used to receive and, inter alia, (i) relay, (ii) store for future transmission, or (iii) process the messages, and generate a new message or signaling to the CPE over another channel or modality.

Per step 604, a request to receive a multicast transmission contained in the list is received. This request is typically received by the CPE 106 from another system on the customer premises. For example, a personal computer connected to a cable modem (CM) could request to view a particular webcast. However, the present invention further contemplates the use of "IPTV" and similar devices which can themselves generate such request, such as via an application running thereon.

In response to the multicast request, the CPE begins processing the physical channel associated with the requested multicast transmission per step 606 based on the information contained in the multicast transmission list. In some instances, this will require changing the tuning from a first physical channel to a second channel. In other cases, it will involve processing an additional physical channel. Once the processing of the physical channel begins, the multicast transmission can then be forwarded to the requesting system (such as a computer system) on the customer premises, or even a mobile device in communication therewith. By changing channels using, e.g., the information contained in a broadcast message, the present embodiment of the invention allows for multicast transmissions to be received without the use of a return channel. Thus, even if the return channel is impaired, or a receive-only device is utilized, multicast transmission can be received and processed by the CPE or other client device.

Figure 7:
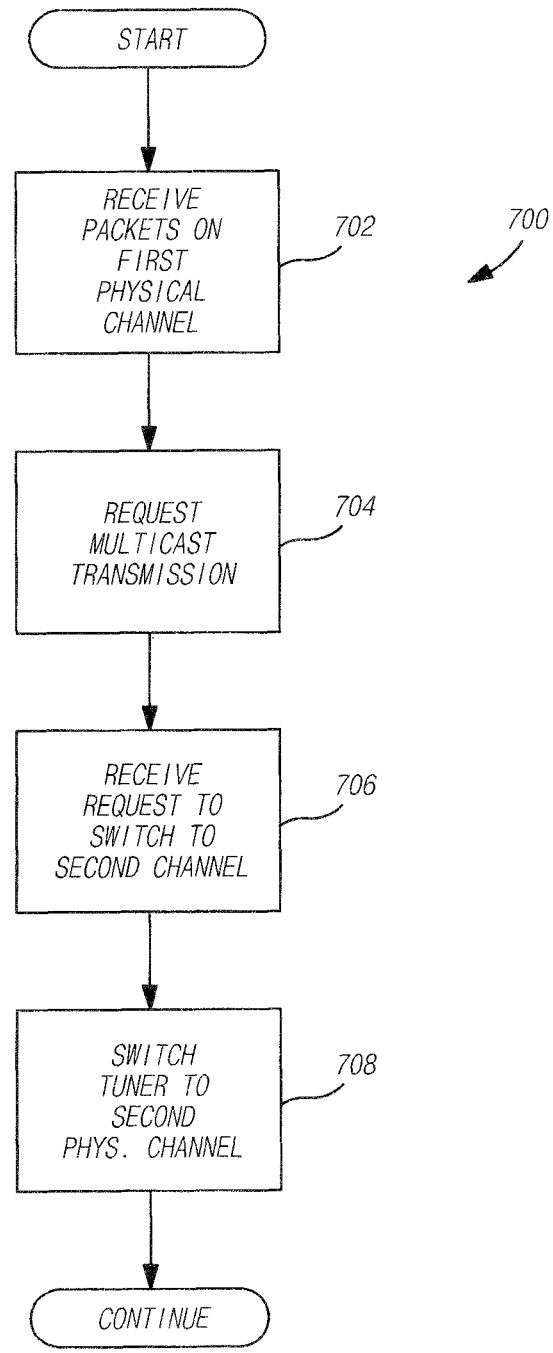
FIG. 7 is a logical flow chart illustrating a fifth exemplary embodiment of the method of channel switching in accordance with the invention.

FIG. 7 is a flow chart illustrating the operation of a cable modem in accordance with one embodiment of the invention. The method begins at step 702 wherein IP packets are received on a first physical channel.

At step 704, the cable modem generates a request to receive a multicast transmission. At step 706, an instruction to switch to a second physical channel is received by the cable modem, such as from the CMTS, head-end, or other network agent. The cable modem then tunes to the second physical channel per step 708.

By switching to a second physical channel, the method of FIG. 7 provides for more efficient use of the spectrum available on the cable network. In particular, when a requested multicast transmission is available on another physical channel (e.g., QAM), a given cable modem (or modems) can switch to that physical channel, thereby eliminating the need to establish a second multicast transmission on the network.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

Controller Device—

Figure 8:
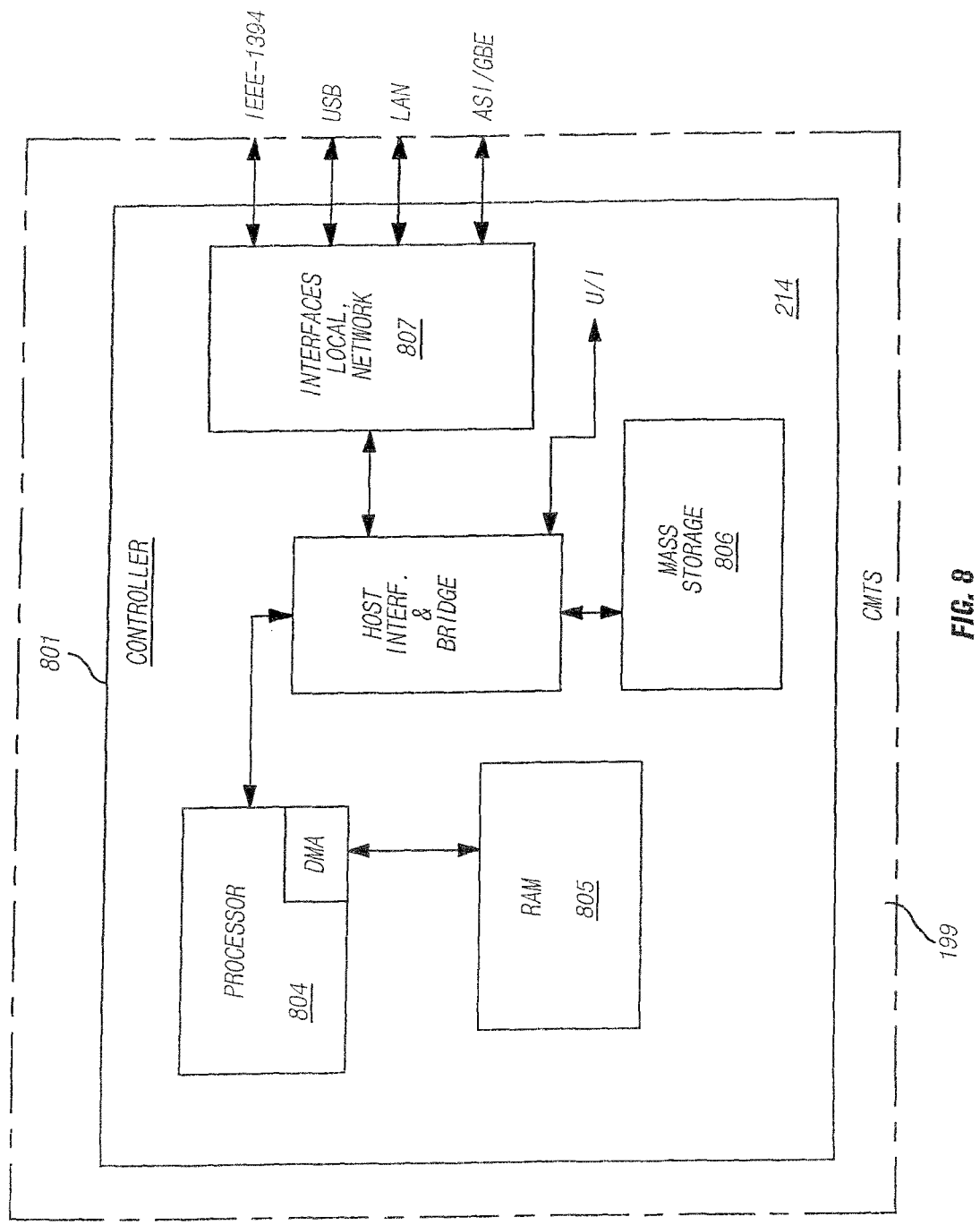
FIG. 8 is a functional block diagram illustrating an exemplary network hub controller device according to the invention.

Referring now to FIG. 8, a first embodiment of the improved network IP controller device 214 according to the present invention is described. It will be appreciated that while described in the context of a CMTS 199 or centralized switching (e.g., BSA) server 196 as shown in FIG. 1 c, the device may be adapted for use at other locations within the network.

Furthermore, as previously noted, the IP controller entity 214 may comprise a distributed functionality, wherein two or more portions of a distributed application (DA) in communication with one another are utilized.

As shown in FIG. 8, the exemplary device 214 comprises a computerized system 801 including a digital processor(s) 804, RAM 805, mass storage device 806, and a plurality of interfaces 807 for connection with other network apparatus such as LANs, CMTS 199, QAM modulators, the local service node hardware, IP routers and other packet network devices, network management and provisioning systems, local PCs, etc. Other components which may be utilized within the controller apparatus 801 (depending on where it is employed and how it is physically implemented) include encryption/decryption, amplifiers, board level electronic components, as well as media processors and other specialized SoC or ASIC devices. Support for various processing layers and protocols (e.g., DOCSIS MAC, 802.3, OOB channels, DHCP, SNMP, UDP, SNMP, H.323/RTP/RTCP, VoIP, SIP, etc.) may also be provided as required.

The controller apparatus 801 of FIG. 8 may take any number of physical forms, comprising for example one of a plurality of discrete modules or cards within a hub or head-end component of the type well known in the art. The controller may also comprise firmware, either alone or in combination with other hardware/software components such as those previously described. Alternatively, the controller apparatus 801 may be a stand-alone device disposed at the hub, head-end, or other location. Numerous other configurations may be used. It may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, the IP packet controller functionality described above may take the form of one or more computer programs running on a single device disposed within the network (such as the controller apparatus 801). As yet another example, portions of the functionality may be rendered as a dedicated or application specific IC (ASIC) having code running thereon. Myriad different configurations for practicing the controller device of the invention will be recognized by those of ordinary skill in the network arts provided the present disclosure.

CPE—

Figure 9:
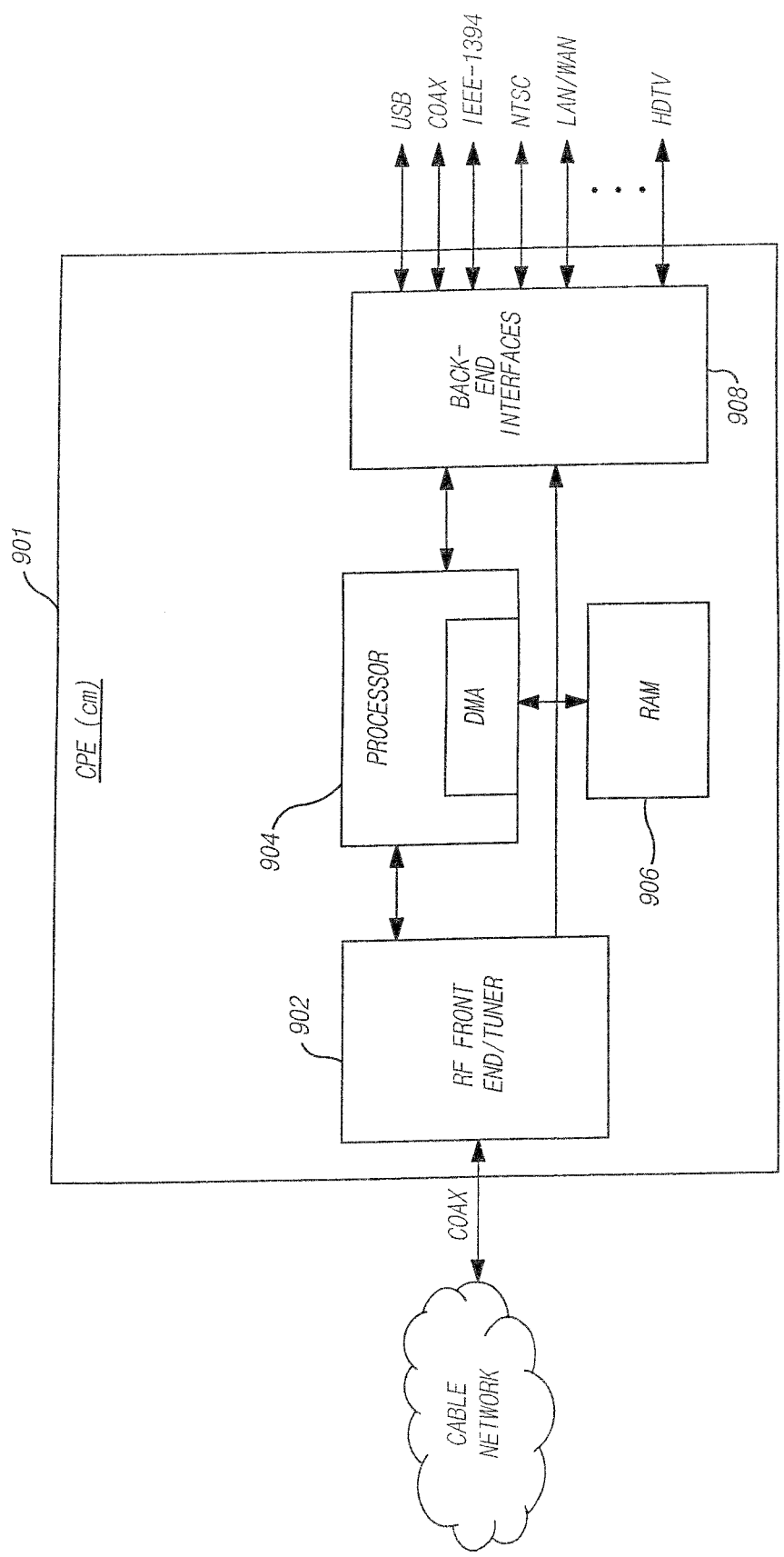
FIG. 9 is a functional block diagram illustrating an exemplary CPE device according to the invention.

FIG. 9 illustrates a first embodiment of the improved CPE 106 according to the present invention. As shown in the simplified diagram of FIG. 9, the CPE 106 generally comprises a DOCSIS-compliant embedded system (e.g., cable modem) 901 having an RF front end 902 (including at least one tuner and QAM modulator/demodulator/ and encryption/decryption) for interface with the HFC network 101 of FIGS. 1-1c. The CPE 901 may also include a digital processor(s) 904, storage device 906, and a plurality of interfaces 908 (e.g., video/audio interfaces, IEEE-1394 "Firewire", USB, serial/parallel ports, etc.) for interface with other end-user apparatus such as personal computers, personal electronics, WiFi or other network hubs/routers, etc., depending on its level of desired capability. Other components which may be utilized within the device (deleted from FIG. 9 for simplicity) various processing layers (e.g., DOCSIS MAC or DAVIC OOB channel, MPEG, etc.) as well as media processors and other specialized SoC or ASIC devices. These additional components and functionality are well known to those of ordinary skill in the cable modem and embedded system fields, and accordingly not described further herein.

The exemplary modem device 901 may also further comprise one or more software applications or algorithms adapted to receive upstream communications directed to its MAC or DOCSIS layer to include: (i) physical channel tuning messages issued by the controller 214; (ii) broadcast "list" or mapping messages or TMMs; and (iii) communications from the connected PC or other IP-enabled device. The CPE 901 may also integrate all of these functions into one device (e.g., an integrated DSTB/CM and IP-TV device) if desired. A wireless (e.g., WiFi or PAN) gateway may also be integrated into the CM 901, thereby allowing for wireless communication between the device 901 and a local wireless PC, laptop, or mobile device.

In the case of multicast requests received by the CM 901 from a connected device (e.g., video application running on the connected PC), the CM 901 can pass on or reissue such upstream requests. The upstream bandwidth consumption by the aforementioned protocol is not significant; the size and frequency of messaging by the CM (even when considered in the aggregate) is effectively inconsequential, thereby making the processes of the present invention substantially transparent in terms of bandwidth consumption.

It is also noted that in the illustrated embodiment, upstream communication is required for viewers to initiate new multicasts (or delivery thereof). However, if a multicast is already active, the upstream is not needed; rather the CM can merely wait for a TMM that lists the channels over which the requested multicast is delivered, and then tune to one of those channels.

In the case of autonomous or stand-alone switching (i.e., where no upstream channel is available), the CM software is configured to analyze the TMM or comparable messages to identify common multicast delivery via a physical channel not presently in use by that CM 901, and cause the CM tuner to tune to the appropriate QAM in order to aggregate delivery of the multicast traffic as previously described herein. This evaluation can be conducted on a periodic, continual, or anecdotal basis. For example, the algorithm can be programmed to cause the CM 901 to periodically evaluate the TMMs (such as upon receipt of each new TMM during streaming of packetized multicast content) to determine if further aggregation by retuning is possible.

Operations/Business Rules Engine—

In another aspect of the invention, the aforementioned controller entity 214 (e.g., rendered as one or more computer programs) includes a so-called "rules" engine. This engine comprises, in an exemplary embodiment, a series of software routines running on the parent computer device or other associated hardware/firmware environment adapted to control the operation of the DOCSIS allocation and switching algorithms previously described. These rules may also be fully integrated within the controller 214 itself, and controlled via e.g., a GUI on a PC. In effect, the rules engine comprises a supervisory entity which monitors and selectively controls, via the controller entity 214, the IP content switching and delivery functions at a higher level, so as to implement desired operational or business rules. The rules engine can be considered an overlay of sorts to the controller algorithms previously described herein with respect to FIGS. 3-7. For example, the controller 214 may invoke certain operational protocols or decision processes based on requests received from the CPE 106, demographic data, geographic data, etc. However, these processes may not always be compatible with higher level business or operational goals, such as maximizing profit or system reliability. Hence, when imposed, the business/operational rules can be used to dynamically (or manually) control the operation of the controller 214. The rules may be, e.g., operational or business-oriented in nature, and may also be applied selectively in terms of time of day, duration, specific local areas, or even at the individual user level.

For example, one rule implemented by the rules engine may comprise invoking CPE switching only when it is required; i.e., when bandwidth usage relating to additional DOCSIS QAMs becomes an issue. Similarly, a related rule might impose a moratorium on establishing new QAMs for DOCSIS use (assuming that all multicast requests can be serviced by existing QAMs via the switching algorithms previously described) until a certain minimum threshold of available bandwidth is present, thereby avoiding contention for bandwidth resources with other services using non-DOCSIS channels.

Another rule might consider the allocation of DOCSIS channels based on a more global or network-wide perspective, and/or based on use or viewing patterns which are common across the entire network (e.g., certain peak viewing periods for IP-TV or similar services), which would benefit from increased multicast switching "compression" or aggregation. Along these lines, a heuristic or metric can be used to measure bandwidth compression, as shown in Eqn. (1):

$$CR=BW_u/BW_s \quad \text{Eqn. (1)}$$

Where:
CR=Compression ratio;
$BW_u$=Uncompressed or unswitched bandwidth; and
$BW_s$=Switched or compressed bandwidth.

Hence, when there is no switching, there is no compression and CR=1. However, when the multicasts (CMs) are switched in order to reduce redundancy, CR increases to a value greater than 1, indicating that some level of efficiency improvement exists. Clearly, the larger the bandwidth consumed by one instance of the multicast ("static" bandwidth), and the greater the number of users requiring delivery of that multicast, the greater the value of CR (and hence the greater the efficiency benefits realized through such switching). An algorithm to analyze these inputs (i.e., "static" bandwidth and number of users requesting the multicast) can be readily fashioned in order to more accurately determine the benefits of CM switching, and any tradeoffs with other parameters (such as loss of statistical pool size).

It will also be appreciated that certain subsets of channels can be considered a basis for channel switching decisions. For example, a subset of Y channels out of an available pool of X channels may comprise the basis for the switching algorithms. This may be driven by, inter alia, the desire to maintain certain QAM pool statistics while also affording the benefits of CM switching as previously described.

It will be appreciated that less "binary" approaches than that described above can be utilized consistent with the invention. For example, a supervisory process (e.g., algorithm) may comprise a fuzzy logic, Bayesian, or similar approach to classify network allocation of multicasts/QAMs according to, for example, the level of aggregation of the multicasts. A low level of aggregation would correspond to a comparatively higher degree of multicast replication (and hence higher inefficiency), while a high level of aggregation would correlate to a highly "switched" state wherein little if any replication of multicasts is used (high efficiency). As previously noted, it may be desirable under certain circumstances to consider other metrics such as statistical pool efficiency, and hence the aforementioned fuzzy or comparable processes may be used in a decision-making algorithm in order to find an optimal balance between the two or more competing objectives.

Many other approaches and combinations of operational and/or business rules are envisaged consistent with the invention, as will be recognized by those of ordinary skill when provided this disclosure.

In another aspect, it will be recognized that the present invention can advantageously be utilized consistent with the methods and apparatus described in co-owned and co-pending U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety. For example, the "switched" system can be used to perform "backhauls" to the local hub or other network node. For example, a business-class circuit backhaul to the local hub is envisioned, such as for "neighborhood camera" applications. In one exemplary embodiment, separate analog video feeds from one or more cameras (or other sensors) are generated and backhauled using the local content-based network distribution system. Specifically, this backhaul" approach removes the downstream bandwidth limitations under prior art approaches; rather, the only effective limitations are in the upstream direction (since the video or other signals from the cameras/sensors are being backhauled to the local hub in the upstream direction). Signal replication of the type well known in the networking arts is used to efficiently make the backhauled content available immediately for transmission in the downstream direction. The upstream signals may be replicated on a node-by-node basis, and every node can have its own cameras/sensors if desired. The backhauled signals can be converted to an IP protocol/encapsulation as previously described (if required), and then delivered over the DOCKS QAMs to the user's PC or other IP-enabled device via the CM. Hence, users can be provided with an IP-TV or comparable version of the backhauled signals via their CM and PC.

These services can form the basis of a business model within the aforementioned cable system, thereby providing an additional revenue stream obtained largely from under-utilized bandwidth already existing within the system by virtue of the broadcast switched architecture (BSA). This adds great flexibility to the network operator, and allows for generation of revenue from otherwise unutilized "upstream" bandwidth" that is already available in the extant network infrastructure.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. In a content delivery network comprising at least one distributing device, said distributing device being configured to distribute a plurality of packetized data streams, a plurality receiving devices being configured to receive said plurality of packetized data streams, and a plurality of physical channels providing communication from said at least one distributing device to said plurality of receiving devices, a method of operating said network to efficiently deliver said plurality of packetized data streams as one or more multicast transmissions, said method comprising:
   transmitting to at least a portion of said plurality of receiving devices a map relating individual ones of multicast transmissions to respective ones of said plurality of physical channels;
   receiving a request from at least one of said at least portion of said plurality of receiving devices for at least one of said packetized data streams being transmitted in a first one of said multicast transmissions; and
   causing said at least one receiving device to process a physical channel corresponding to said first one of said multicast transmissions to obtain access to said at least one packetized data stream.

2. The method of claim 1, wherein said one or more multicast transmissions each comprise individual ones of said plurality of packetized data streams.

3. The method of claim 1, wherein said request originates from a client device serviced by and in data communication with said at least one receiving device.

4. The method of claim 3, wherein said client device comprises an Internet Protocol (IP) enabled computerized device.

5. The method of claim 4, wherein said IP enabled computerized device comprises a mobile device, and said data communication comprises a WLAN link between the at least one receiving device and the mobile device.

6. The method of claim 1, wherein said physical channel corresponding to said first one of said multicast transmissions is also used by at least one other of said plurality of receiving devices to receive said first one of said multicast transmissions.

7. The method of claim 1, wherein said at least one of said portion of said plurality of said receiving devices comprises a modulator/demodulator apparatus configured to communicate with a distant modulator/demodulator apparatus over at least one of said plurality of physical channels.

8. The method of claim 7, wherein said modulator/demodulator apparatus of said receiving device comprises a QAM demodulator.

9. The method of claim 1, wherein said content delivery network comprises a wireless network.

10. The method of claim 9, wherein said wireless network comprises a satellite network, and said plurality of physical channels comprise a plurality of QAM channels.

11. The method of claim 1, wherein the method further comprises encapsulating content that has been encoded using a first video codec using an IP protocol in order to form at least one of said packetized data streams.

12. The method of claim 11, wherein said first video codec comprises an H.264-based codec.

13. The method of claim 11, further comprising utilizing an MPEG-based transport for carrying said encapsulated at least one data stream over one or more of said physical channels.

14. The method of claim 13, wherein said one or more physical channels comprises DOCSIS-compliant QAM channels.

15. In a content distribution network comprising a node, a plurality of modems, and a plurality of physical channels providing communication between said node and said modems, a method of operating said network to efficiently deliver multicast packetized transmissions, comprising:
   transmitting multicast transmission information from said node to at least a portion of said modems, said information relating said multicast transmissions and at least one corresponding physical channel on which each multicast transmission is transmitted;
   receiving a request to receive a first of said multicast transmissions; and
   configuring at least one of said modems to process a physical channel associated with said first multicast transmission based at least in part on said information.

16. The method of claim 15, wherein said request originates from a client device serviced by and in data communication with at least one Internet Protocol (IP) enabled computerized device.

17. The method of claim 15, wherein:
   said request corresponds to a first one of a plurality of receiving devices; and
   said physical channel corresponding to said first multicast transmission is also used by at least one other of said plurality of receiving devices to receive said first multicast transmission.

18. The method of claim 17, wherein said request originates from one of said receiving devices comprising a modulator/demodulator apparatus configured to communicate with a distant modulator/demodulator apparatus over at least one of said physical channels.

19. The method of claim 15, wherein said network comprises a satellite network, and said physical channels comprise QAM channels.

20. The method of claim 15, wherein the method further comprises encapsulating content that has been encoded using a first video codec using an IP protocol in order to form at least one of said multicast transmissions.

21. The method of claim 20, wherein said first video codec comprises an H.264-based codec.

22. The method of claim 20, further comprising utilizing an MPEG-based transport for carrying said encapsulated at least one multicast transmission over one or more of said physical channels.

23. The method of claim 22, wherein said one or more physical channels comprises DOCSIS-compliant QAM channels.

24. In a content delivery network, a method for providing Internet Protocol (IP) packetized data to a plurality of network subscribers, said method comprising:
   transmitting said IP packetized data to a first one or more of a plurality of modems in communication with said network over a first one of a plurality of physical channels, said first one or more modems being associated to at least a first group of one or more of said plurality of network subscribers;
   transmitting said IP packetized data to at least a second one or more of said plurality of modems in communication with said network over a second one of said plurality of physical channels, said second one or more modems being associated to at least a second group of one or more of said plurality of network subscribers; and
   switching said second one or more modems to said first one of said plurality of physical channels;
   wherein said act of switching enables both said first and second one or more modems to receive said IP packetized data in a substantially multicast fashion from an identical physical channel.

25. The method of claim 24, wherein said first group and said second group of one or more subscribers share at least one attribute.

26. The method of claim 24, wherein said act of switching further comprises transmitting second IP packetized data over said first one of said plurality of physical channels, said second IP packetized data being uniquely addressed to said second one of said plurality of modems.

27. The method of claim 24, wherein said transmitting second IP packetized data is performed substantially contemporaneous with said act of switching said second one of said plurality of modems to said first one of said plurality of channels.

28. The method of claim 24, further comprising selectively switching at least one program stream off based on a lack of one or more requests for delivery of said program stream.

29. The method of claim 28, wherein said selective switching of said at least one program stream is conducted by an identical entity to that which controls said switching of said second one of said plurality of modems.

30. The method of claim 24, further comprising reallocating the second of said physical channels after said switching has been completed.

31. The method of claim 24, further comprising removing or tearing down the second of said physical channels after said switching has been completed in order to conserve bandwidth.

32. The method of claim 24, wherein the method further comprises encapsulating content that has been encoded using a first video codec using the IP protocol in order to form at least one of said first or second IP packetized data.

33. The method of claim 32, wherein said first video codec comprises an H.264-based codec.

34. The method of claim 32, further comprising utilizing an MPEG-based transport for carrying said encapsulated IP packetized data over one or more of said physical channels.

35. The method of claim 24, wherein said transmitting said IP packetized data to at least a second one or more of said plurality of modems in communication with said network over a second one of said plurality of physical channels comprises transmitting said IP packetized data over said second physical channel as a unicast to a single one of said second modems.

36. The method of claim 35, further comprising performing at least one of: (i) reallocating the second of said physical channels, and/or (ii) removing the second of said physical channels, after said switching has been completed.

37. The method of claim 24, wherein said first group and said second group of one or more subscribers comprise part of an identical network service group.

38. Apparatus configured to process network traffic, said apparatus comprising:
   a digital signal processing unit configured to process data from a plurality of physical channels; and
   a control unit configured to:
      process a request to receive a packetized content stream on a first physical channel;
      cause said digital signal processing unit to process said first physical channel;
      receive a message to switch from said first physical channel to a second physical channel, said second physical channel configured to provide a multicast of said packetized content stream; and
      cause said digital signal processing unit to process said second physical channel, and cease said processing of said first physical channel;
   wherein said message to switch from said first to said second physical channel is received only after it is determined that said packetized content stream has been previously established on said second physical channel.

39. The apparatus of claim 38, wherein said first physical channel comprises a radio frequency channel centered substantially at a first frequency, and said second physical channel comprises a radio frequency channel centered substantially at a second, different frequency.

40. The apparatus of claim 38, wherein unicast IP packets and multicast IP packets are received on an identical physical channel.

41. A method for operating a device in a content delivery network, said device configured to receive Internet Protocol (IP) video content via a modulator/demodulator interface, said method comprising:
   receiving said IP video content carried via a first plurality of radio frequency (RF) channels, said first plurality of RF channels capable of being demodulated by said interface;
   receiving information used as a basis of switching said device to a second plurality of RF channels, said IP video content being carried via said second plurality of RF channels, said first plurality of RF channels having one or more RF channels that are not part of said second plurality of RF channels; and
   switching said device to demodulate said second plurality of RF channels and receive said IP video content;

wherein said receiving of said IP video content on said first plurality of RF channels is ceased after said switching has been completed in order to conserve bandwidth; and wherein at least one other device is simultaneously receiving said IP video content on said second plurality of RF channels.

42. The method of claim 41, wherein two or more of said first plurality of RF channels comprise non-contiguous RF channels, and two or more of said second plurality of RF channels comprise non-contiguous RF channels.

43. The method of claim 41, wherein said IP video content carried via said first plurality of RF channels or said second plurality of RF channels is allocated according to either a most-loaded algorithm or a least-loaded algorithm.

44. The method of claim 41, further comprising receiving program information data such that said IP video content spread across said first plurality of RF channels and spread across said second plurality of RF channels may be received, decoded and reassembled by said device.

45. The method of claim 41, wherein said first plurality of RF channels comprise at least a first program rendered in a first format, and said second plurality of RF channels comprise at least said first program rendered in a second format.

46. The method of claim 45, wherein said first format comprises standard definition (SD) encoded content, and said second format comprises high definition (HD) encoded content.

47. The method of claim 45 wherein said first format comprises H.264 encoded content, and said second format comprises MPEG-2 encoded content.

48. The method of claim 45 wherein said second format comprises H.264 encoded content, and said first format comprises MPEG-2encoded content.

49. A method for operating a device in a content delivery network, said device configured to receive Internet Protocol (IP) video content via a modulator/demodulator interface, said method comprising:

receiving said IP video content carried via a first radio frequency (RF) channel, said first RF channel being capable of being demodulated by said interface;

receiving information used as a basis of switching said device to a plurality of second RF channels, said IP video content being carried via said plurality of second RF channels; and switching said device to demodulate said plurality of second RF channels and receive said IP video content;

wherein said receiving of said IP video content on said first RF channel is ceased after said switching has been completed in order to conserve bandwidth; and wherein at least one other device is simultaneously receiving said IP video content on said plurality of second RF channels.

* * * * *